[54] PREPARATION OF 17ALPHA-PROPADIENYL STEROIDS

[75] Inventors: Pierre Crabbe, Mexico, Mexico; John H. Fried, Palo Alto, Calif.

[73] Assignee: Syntex Corporation, Panama, Panama

[22] Filed: July 27, 1971

[21] Appl. No.: 166,628

Related U.S. Application Data

[63] Continuation-in-part of Ser. No. 148,173, May 28, 1971, abandoned, which is a continuation-in-part of Ser. No. 817,562, April 18, 1969, abandoned.

[52] U.S. Cl...260/397.4, 260/239.55 R, 260/397.45, 260/397.5, 260/397.3, 424/243
[51] Int. Cl. .....................C07c 169/08, C07c 169/20

Primary Examiner—Elbert L. Roberts
Attorney—Evelyn K. Merker

[57] ABSTRACT

Disclosed is a process for the preparation of 17a-propadienyl steroids of the estrogen, estrane, and androstane series which contain optional substitution at other positions of the nucleus. This process involves treating a corresponding 3-(halopropynyl) steroid with a metal, metal couple, or metal salt reagent in organic reaction media and in the presence of a proton donor. The product 17a-propadienyl steroids of the 6,6-difluoroandrostane and 19-norandrostane series, optionally substituted at the C-3, C-17, and C-18 positions, are new compounds. The 17a-propadienyl products are useful as estrogenic, anti-androgenic, and progestational agents.

24 Claims, No Drawings

PREPARATION OF 17ALPHA-PROPADIENYL STEROIDS

This is a continuation-in-part of application Ser. No. 148,173, filed May 28, 1971 now abandoned which is a continuation-in-part of application Ser. No. 817,562, filed Apr. 18, 1969 now abandoned.

The present invention relates to a novel process which is useful in the preparation of useful steroidal compounds. Specifically, this invention is directed to a process useful in preparing steroidal 17α-allenes.

Certain of the steroid compounds which have a 17α-ethylenically unsaturated side chain, specifically a 17α-propadienyl (allene) grouping, are novel, particularly those 17α-propadienyl steroids of the 6,6-difluoroandrostane and 19-norandrostane series represented by the Formula (I).

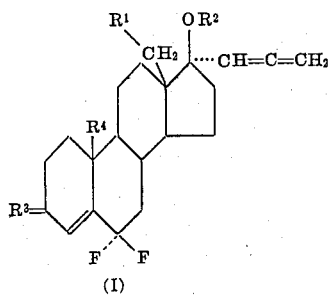

Other 17α-propadienyl steroids have been described. For example, U.S. Pat. Nos. 3,392,165 and 3,392,166 disclose, inter alia, those derivatives of the estrogen, estr-4-ene, estr-5(10)-ene and androst-4-ene series as represented by Formulas (II), (III), and (IV).

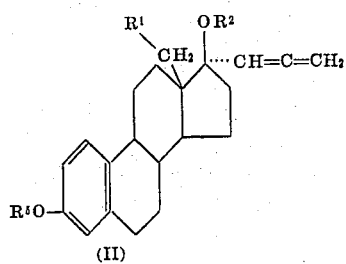

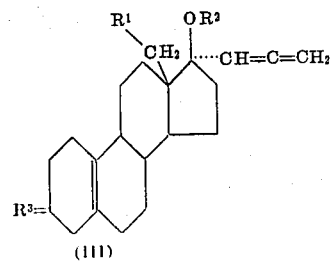

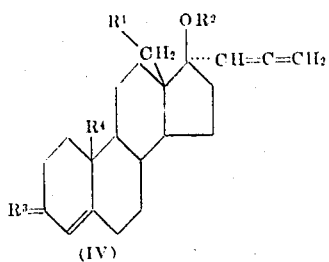

Other useful 17α-propadienyl steroids can be represented by the following formulas:

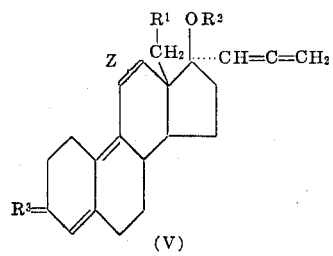

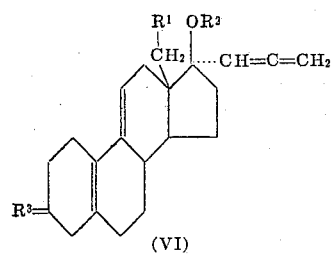

In the above and succeeding formulas, $R^1$ is hydrogen or lower alkyl of from 1 to 3 carbon atoms, inclusive; $R^2$ is hydrogen, tetrahydrofuran-2-yl, tetrahydropyran-2-yl, or a carboxylic acyl group containing less than 12 carbon atoms; $R^3$ is an oxo group or the group

in which $R^6$ is hydrogen, tetrahydrofuran-2-yl, tetrahydropyran-2-yl, or a carboxylic acyl group containing less than 12 carbon atoms; $R^4$ is hydrogen or methyl; $R^5$ is hydrogen, lower alkyl of from 1 to 8 carbon atoms, inclusive, cycloalkyl, tetrahydrofuran-2-yl, tetrahydropyran-2-yl, or a carboxylic acyl group containing less than 12 carbon atoms; and Z is a carbon-carbon single bond or a carbon-carbon double bond.

The 17α-propadienyl derivatives in the estra-1,3,5(10)-triene series (Formula II) possess estrogenic and antiandrogenic activity and are useful in the manner such agents are customarily used for the treatment of conditions responsive to estrogenic and antiandrogenic agents, such as the control and regulation of fertility and the treatment of acne, benign prostate hypertrophy, and hirsutism in females. The 17α-propadienyl derivatives in the 6,6-difluoroandrostane, 6,6-difluoro-19-norandrostane, estr-5(10)-ene, estr-4-ene, androst-4-ene, estra-4,9(10)-diene, estra-4,9(10), 11-triene, and estra-5(10),9(11)-diene series (Formulas I, III, IV, V, and VI) demonstrate progestational, pituitary inhibiting, and anti-fertility activity and are useful in the manner corresponding to such activity such as in the treatment of various menstrual disorders and in the control and regulation of fertility.

The novel process of the present invention comprises reacting a 17α-(3-halopropynyl) steroid compound with a reagent selected from metals having an oxidation potential between +2.37 to +0.74 volts inclusive (measured at 25°C.; see Hodgman et al., *Handbook of Chemistry and Physics*, the Chemical Rubber Publishing Co., Cleveland, Ohio, 42nd Edition, page 1740), chromium metal salts, and zinc-copper couple, to prepare a corresponding 17α-propadienyl steroid. Representative metals having an oxidation potential between +2.37 and +0.74 volts include magnesium, aluminum, manganese, vanadium, zinc, and chromium. Preferred reagents are zinc and zinc-copper couple.

When operating in accordance with preferred embodiments, the present invention is particularly useful for the preparation of the 17α-propadienyl steroids of the estrogen, estrane, and androstane series depicted above in Formulas (I), (II), (III), (IV), (V), and (VI).

The metal, metal salt, or zinc-copper couple reagent is employed in at least chemical equivalent amounts with the steroid starting material. Amounts in excess of this, upwards of a 20 to 50 molar excess, can conveniently be employed. Preferred embodiments involve the use of from 1.5 moles of 20 moles of metal or metal salt reagent per mole of starting steroid.

The reaction is conducted in the presence of organic liquid reaction medium. Suitable media include the customary organic solvents, for example, lower aliphatic alcohols such as methanol, t-butanol, n-propanol, and the like; ethers such as dimethyl ether, dioxane, methyl propyl ether, tetrahydrofuran, and the like; lower aliphatic ketones such as acetone, methyl ethyl ketone, and the like; saturated aliphatic hydrocarbons such as pentane, hexane, octane, and the like; aromatic hydrocarbons such as benzene, toluene, mesitylene, and the like; and carboxylic acids containing less than 12 carbon atoms such as acetic, propionic, trifluoroacetic and the like.

The reaction is conducted in the presence of a proton donor. Suitable proton donors include lower aliphatic alcohols such as methanol, ethanol, propanol, and butanol; carboxylic acids such as acetic, propionic, butyric, and hexanoic; and water; or mixtures thereof. The proton donor is present in amounts approximately stoichiometrically equivalent to the amount of metal or metal salt reagent employed.

When employing a lower aliphatic alcohol or carboxylic acid as liquid reaction media, it can also serve as proton donor. Mixtures of the various proton donors or mixtures of proton donors and other liquid reaction media or aqueous mixtures of water miscible liquid reaction media can also be satisfactorily employed. Suitable mixtures include acetone-water, dioxane-water, benzene-n-propanol, and toluene-acetic acid.

When carrying out the reaction with metals having an oxidation potential higher than about +1.5 volts the organic liquid reaction medium employed is preferably free of active hydrogen atoms. Proper media include the aromatic solvents such as benzene and xylene, and the ethers such as t-butyl ether, glyme, dioxane, or tetrahydrofuran. Similarly, when employing metals having an oxidation potential lower than about +1.5 volts, such as manganese or zinc, the organic liquid reaction medium employed is preferably a lower aliphatic alcohol such as methanol, ethanol, and isopropanol or liquid carboxylic acids containing less than 12 carbon atoms such as acetic, butyric and hexanoic acids. If the reagent employed is a metal salt, which generates a cation of adequate oxidation potential, the reaction is preferably conducted in a polar organic liquid reaction medium which is inert to such salts. Such include, for example, the lower aliphatic ketones, for example, acetone and pentanone and the lower aliphatic alcohols including methanol and ethanol. When the former mentioned ketones are used, the proton donor is preferably provided by water and acetic acid.

The reaction is conducted at a temperature ranging from about 20°C. to about 120°C. and preferably at the boiling point of the reaction mixture and under reflux. The reaction is continued for a period of time sufficient to complete the reaction ranging from about 2 hours to about 48 hours. Longer or shorter periods may be employed depending upon the choice of reaction temperature and reactants employed. In a preferred procedure, the starting steroid compound, dispersed in an organic liquid reaction medium and proton donor, if necessary, is treated with the metal or metal salt reagent on at least a mole per mole basis. The resulting reaction mixture is then heated with stirring for a sustained period of time. Upon completion of the reaction, the respective product is separated and recovered from the reaction mixture via conventional techniques. Included in such conventional techniques are filtration, decantation, evaporation, chromatography, recrystallization, and the like.

The starting steroid compounds of the present invention which contain a 17α-(3-halopropynyl) grouping are prepared from the corresponding 17α-(3-hydroxypropynyl) compounds. Such conversion is accomplished in the bromo and chloro series by treatment of the hydroxy compound with thionyl bromide or phosphorous pentabromide or with thionyl chloride or phosphorous pentachloride in the presence of a tertiary amine base such as the tertiary alkyl amines, pyridine, lutidine, and so forth. The reaction is carried out in any convenient order or fashion at temperatures of from about 0° to about 20°C. and conveniently, in organic liquid reaction medium, such as ether, benzene, and the like. See pp. 48+49 hereof for preparation of the iodo compounds.

Alternatively, the bromo and chloro derivatives can be prepared by treating the hydroxy compound with triphenylphosphine and carbon tetrabromide or carbon tetrachloride in organic reaction medium, such as dimethylformamide and dioxane, at about 110°C. for a few minutes followed by the usual recovery procedures.

In the fluoro series, the hydroxy compound is treated with a hydrocarbon sulfonyl fluoride including benzyl sulfonyl fluoride, tosyl fluoride and mesyl fluoride. This process also preferably employs an inert hydrocarbon solvent such as hexane, heptane, benzene, toluene or an esterified or etherified alcohol such as dimethoxyglycol. Other suitable solvents are chloroform and nitromethane. The reaction is carried out at temperatures of from 0°C. to about 150°C. for from 1 to 8 hours.

Alternatively, the 3-fluoropropynyl compounds are prepared by treating the 3-hydroxypropynyl compounds with 1-diethylamino-1,1,2-trifluoro-2-chloroethane in methylene chloride, acetonitrile, diethyl ether, dioxane, tetrahydrofuran, and the like, in the method known per se. — see U.S. Pat. No. 3,444,188, for example.

The 17α-(3-hydroxypropynyl) steroid compound from which the 3-halopropynyl derivatives are prepared are, in turn, prepared via several methods. In one such method, Grignard reagent is prepared upon treatment of the product of the reaction of propargyl alcohol and dihydropyran, 3-(tetrahydropyran-2′-yloxypropyne), with magnesium and ethyl bromide in the method known per se. This reagent is then reacted with a 17-oxo steroid. In this manner, the corresponding 17α-(3-tetrahydropyran-2′-yloxypropynyl) steroidal derivative is prepared. Thereafter, the thus formed derivative is conventionally hydrolyzed such as with a mineral or organic acid to hydrolyze the tetrahydropyran-2′-yloxy group forming the hydroxyl.

In another method for the preparation of the 3-hydroxypropynyl compounds hereof, which method is particularly useful in the estrogen series, a 17-oxo starting compound is ethynylated via the method known per se, that is, through treatment with potassium acetylide to give the 17α-ethynyl-17β-hydroxy derivative. Thereafter, the 17β-hydroxy group is preferably protected before further reaction, such as by forming the tetrahydropyran-2'-yloxy or tetrahydrofuran-2'-yloxy ether thereof. In such further reaction, the ethynyl group is elaborated as respect the addition of the hydroxymethyl group as a replacement for the acidic hydrogen. This is accomplished by forming the ethynyl lithium salt (by treating the ethynyl derivative at room temperature with an equivalent amount of an ether solution of methyl, butyl, or phenyllithium) and treating this with an equivalent or slight excess amount of paraformaldehyde at gentle reflux in ether followed by hydrolysis in accordance with the procedures described by Schaap et al. in *Rec. Trav. Chim.* 84, 1200 (1965) as well as the references cited therein.

The procedures for preparing the starting 3-halopropynyl steroids hereof are more completely described in, for example, U.S. Pat. No. 3,029,261.

In the preparation of the starting 17α-(3-halopropynyl) derivatives in the 6,6-difluoroandrostane and 19-norandrostane series, the foregoing preparations can be practiced upon the corresponding 6,6-difluoroandrost-4-ene-3,17-diones and 6,6-difluoro-19-norandrost-4-ene-3,17-diones and the 18-alkyl derivatives thereof. In practice, the 6,6-difluoro grouping is introduced into the precursor androst-4-ene-3,17-diones and 19-norandrost-4-ene-3,17-diones or 18-alkyl derivatives thereof. One method by which this is done is described in U.S. Pat. No. 3,219,673. This method involves treating a 3-acyloxy-5-fluoro-6-keto steroid (which are known or can be prepared as described in the cited patent and its references) with sulfur tetrafluoride to prepare the corresponding 3-acyloxy-5,6,6-trifluoro steroid which is hydrolyzed to the 3-hydroxy-5,6,6-trifluoro compound. The latter compound is oxidized to the corresponding 3-keto-5,6,6-trifluoro derivative which is then treated with a dehydrofluorinating agent such as alumina to provide the 3-keto-$\Delta^4$-6,6-difluoro compound.

Another method by which these 6,6-difluoro precursor steroids are prepared involves twice consecutively forming an enol ether and treating this with perchloryl fluoride. Thus, the starting androst-4-ene-3,17-dione is converted to its enol ether and it is treated with perchloryl fluoride to form the 3-keto-$\Delta^4$-6-fluoro derivative. The same procedure is followed with this compound to form the 3-keto-$\Delta^4$-6,6-difluoro products. The enol ether formation and fluorination treatment are each conventional reactions in the steroid art.

The starting 17α-(3-substituted propynyl) compounds in the $\Delta^{4,9(10)}$-estradiene, $\Delta^{5(10),9(11)}$-estradiene, and $\Delta^{4,9(10),11}$-estratriene series are prepared from the corresponding 17-oxo compounds as described above. The $\Delta^{4,9(10),11}$-estratrien-17-one compounds are known and can be prepared by treating a 3-keto-$\Delta^{5(10)}$ steroid with bromide in pyridine solution to form the corresponding 3-keto-$\Delta^{4,9(10)}$-diene, ketalizing the resultant diene to the corresponding 3-ketal-$\Delta^{5(10),9(11)}$-diene, epoxidizing this ketal diene with a peroxy acid, and treating the epoxidized product with strong acid. Alternatively, a 3-keto-$\Delta^{4,9(10)}$ is treated with hydrogen chloride in methanol at room temperature to obtain the corresponding 3,3-dimethoxy-$\Delta^{5(10),9(11)}$ compound which is hydrolyzed to give the 3-keto-$\Delta^{5(10),9(11)}$ compound. This compound is then converted to the 3-keto-$\Delta^{4,9(10)}$ and thence to the 3-keto-$\Delta^{4,9(10),11}$ compounds as described above. See *Steroids* 8:1, p. 87 (July 1966) and U.S. Pat. Nos. 3,282,785 and 3,461,118, the subject matter of which is hereby incorporated by reference. The 17-oxo compounds in the $\Delta^{4,9(10)}$, $\Delta^{5(10),9(11)}$ and $\Delta^{4,9(10),11}$ series are reduced such as with lithium tri-t-butoxy aluminum hydride, to form the 3,17-diol. This is acylated and the 3-acylate-17-ol separated by chromatography. The 17-alcohol is then oxidized such as with chromic acid to provide the 17-one compound which is elaborated as described above.

Alternatively, the 3-keto-17β-ol compound can be protected by formation of the 3,3-ketal followed by oxidation of the 17β-ol.

In the preferred embodiments, the desired noninterfering elaborative groupings at the other optional sites of the molecule are introduced prior to the novel, principal reaction hereof. Protection is preferably provided for those groups which may compete or interfere with the principal reaction hereof or with the processes preparative to the principal reaction hereof. Examples of such protection include forming the ketal or enol ethers or the 3-oxo function which can be restored later in the synthetic sequence.

In the estrogen series, treatment of, for example, the 17α-ethynyl-3,17β-diol derivative with an appropriate carboxylic acid anhydride, such as acetic anhydride, in pyridine yields the 3-acyloxy-17β-hydroxy derivative selectively. Use of an acid anhydride in the presence of the corresponding acid and an acid catalyst such as p-toluenesulfonic acid yields the 3,17β-diacyloxy derivative. This diester may then be selectively saponified as through the use of methanolic potassium bicarbonate to yield the corresponding 3-hydroxy-17β-acyloxy derivative. Similarly, etherification may be performed via the conventional procedures. Thus, treatment with dihydropyran in the presence of an acid catalyst such as p-toluenesulfonic acid, p-toluenesulfonyl chloride, dinitrobenzene sulfonic acid or the like, yields the corresponding tetrahydropyran-2-yloxy derivative. Formation of the mono-tetrahydropyranyl ether may be accomplished by selective protection of other hydroxy groups as through ester formation, in the manner described above, with alkaline hydrolysis of such ester groups after formation of the ether, if desired. Formation of 3-methoxy derivatives may likewise be realized through the use of dimethylsulfate and potassium hydroxide in the conventional manner.

Similar conventional esterification and etherification procedures can be employed in the other series of starting compounds for the present invention. For example, in the preparation of the 3β,17β-diacylate starting materials for the process hereof, the 3,17-dioxo compound can be reduced and acylated with about one chemical equivalent of acylating agent. The product mixture is then chromatographed to separate the 3β-acylate-17β-ol compound. This derivative is then oxidized to the 3β-acylate-17-oxo compound. The Grignard method of introducing the hydroxypropynyl group at C-17α, as described above, is then followed including the addition of the appropriate acylating agent before workup to form the 3β,17β-diacylate-17α-tetrahydropyranyloxypropynyl compound. This compound is then converted to the corresponding halopropynyl derivative.

The 3β,17β-diethers can be conveniently formed by initially preparing the 3β,17β-diethers and then following this with the formaldehyde method of preparing the 17α-hydroxypropynyl compounds, as described above.

If a mixed ester-ether compound is desired, the monoether is prepared in a sequence similar to that used for preparing the mono-acylate. Thereafter, the described Grignard method is followed ending with an acylation before work-up. Alternatively, the monoacylate prepared as described above, can be ethynylated at C-17α and the C-17β hydroxyl etherified. Thereafter, the described formaldehyde method is employed for the preparation of the corresponding 17α-hydroxypropynyl compound.

In the present specification and claims, the term "-carboxylic acyl group" and "carboxylic acyloxy group" denote acyl and acyloxy groups which contain less than 12 carbon atoms and which can be of a straight, branched, or cyclic chain structure. This structure can further be saturated, unsaturated or aromatic and optionally substituted by functional groups such as hydroxy, alkoxy containing up to 5 carbon atoms, acyloxy containing up to 12 carbon atoms, nitro, amino, halogeno and the like. Representative esters thus include acetate, propionate, enanthate, benzoate, trimethylacetate, t-butylacetate, phenoxyacetate, cyclopentylpropionate, aminoacetate, β-chloropropionate, adamantoate, bicyclo[2.2.2] octane-1-carboxylate, bicyclo[2.2.2]-oct-2-ene-1-carboxylate, 4-methyl-bicyclo[2.2.2] oct-2-ene-1-carboxylate and so forth. The "lower alkyl" group in the present specification and claims can be of straight or branched chain structure. Representative alkyl groups include methyl, ethyl, isopropyl, n-butyl, t-butyl, n-hexyl, n-heptyl, n-octyl, isooctyl, and the like. In the present specification and claims, the term "cycloalkyl group" which is represented above by $R^5$ include, for example from 3 to 8 carbon atoms. In the present specification and claims, the term "3-halopropynyl" includes 3-bromopropynyl, 3-chloropropynyl, 3-iodopropynyl, and 3-fluoropropynyl, preferably 3-chloropropynyl.

The following preparations and examples serve to further illustrate the manner by which the present invention can be practiced. As such, however, they should not be construed as limitations upon the overall scope hereof.

PREPARATION 1

A solution is prepared by dispersing 29 grams of estr-4-ene-3,17-dione in 600 ml. of dioxane at room temperature with stirring. Ethyl orthoformate (60 ml.) and 1.8 grams of p-toluenesulfonic acid hydrate are added to the resultant mixture. The addition is conducted portionwise, with stirring, and at room temperature. After the addition is complete, the resulting reaction mixture is allowed to stand at room temperature for three and one half hours. After this time, the resulting solution is poured into two liters of ice water. After this has been accomplished, the whole mixture is filtered to yield a crystalline material which is recrystallized from methylene chloride:methanol containing a few drops of pyridine to obtain the desired 3-ethoxyestra-3,5-dien-17-one product.

Proparagyl alcohol (42 grams) is dispersed in 63 grams of 2,3-dihydropyran with stirring. While continuing the stirring at room temperature, phosphorous oxychloride (500 mg.) is added portionwise to the resultant solution. The reaction mixture rapidly becomes warm and is cooled intermitently in ice. After maintaining these conditions for 2 hours and then allowing the temperature of the reaction mixture to stabilize at room temperature, an aqueous solution of potassium hydroxide is added. The mxiture is then extracted with ether and the ether extracts distilled under gradually increasing temperatures and gradually decreasing pressures to obtain the 3-tetrahydropyran-2'-yloxy-propyne product.

Under anhydrous conditions, 3.2 g. of magnesium, 11 ml. of ethyl bromide, and 150 ml. of absolute ether are mixed together at room temperature. To the resulting solution is added, dropwise and at room temperature, 30 g. of the 3-tetrahydropyran-2'-yloxypropyne product obtained as described above. The temperature of the resulting mixture is heated to the boiling point and maintained under reflux conditions for 5 minutes. After this time, the mixture is cooled to room temperature and mixed dropwise with a solution containing 21 grams of 3-ethoxyestra-3,5-dien-17-one which is dispersed in 200 ml. of tetrahydrofuran. After this addition is complete, the reaction mixture is stirred at room temperature for a period of 2 hours. The resulting solution is cooled in an icebath and then mixed with 70 ml. of acetic anhydride. This solution is then left at room temperature for 16 hours. After this, the mixture is poured into an ammonium chloride:ice solution and this is then extracted with ether, the ether extracts being dried and evaporated to a concentrated form. The concentrate is chromatographed to obtain a crystalline product which is crystallized from ethyl acetate:hexane:petroleum ether. Recrystallization from the same solvent mixtures obtains the desired 17α-(3-tetrahydropyran-2'-yloxypropynyl)-17β-acetoxyestr-4-en-3-one product.

17α-(3-Tetrahydropyran-2'-yloxypropynyl)-17β-acetoxyester-4-en-3-one (18 g.) is dissolved in 750 ml. of methanol at room temperature. Thereafter, 20 g. of oxalic acid is dispersed in 150 ml. of water and the resultant aqueous oxalic acid solution is added to the steroid methanol solution at room temperature in a portionwise fashion. The resulting reaction mixture is left overnight at room temperature. The reaction mixture is then neutralized by the portionwise addition of sodium hydroxide and then the neutralized mixture is filtered. The filtrate is concentrated in vacuum to a residue. The residue is extracted with an ether:methylene chloride mixture to provide a solution which is then dried over sodium sulfate. The dried solution is evaporated to obtain a solid. The solid is chromatographed on a column of silica gel eluting with hexane:ethyl acetate (1:1) to obtain a substance which is recrystallized from ethyl acetate:hexane to obtain the 17α-(3-hydroxypropynyl)-17β-acetoxyestr-4-en-3-one prodcut as a crystalline solid.

A mixture of 20 ml. of absolute pyridine, 8 ml. of freshly distilled thionyl chloride, and 90 ml. of absolute tetrahydrofuran is prepared at room temperature with stirring. 17α-(3-Hydroxypropynyl)-17β-acetoxyestr-4-en-3-one (3.4 g.) which is dissolved in 50 ml. of anhydrous tetrahydrofuran is added to the resulting solution over a 25 minute period at room temperature. After the addition is complete, the reaction mixture is stirred at room temperature for 35 minutes. After this period of time, the mixture is poured into ice water and the resulting mixture is extracted with ether:methylene chloride. The extracts are washed with water and dried over sodium sulfate. The dried material is evaporated to an oil. The oil is chromatographed on silica gel to obtain the desired 17α-(3-chloropropynyl)-17β-acetoxyestr-4-en-3-one product.

In like manner, the foregoing procedures can be practiced on the corresponding 18-alkyl compounds thus providing as final compounds, 17α-(3-chloropropynyl)-17β-acetoxy-18-methylestr-4-en-3-one, 17α-(3-chloropropynyl)-17β-acetoxy-18-ethylestr-4-en-3-one, 17α-(3-chloropropynyl)-17β-acetoxy-18-n-propylestr-4-en-3-one.

PREPARATION 2

To a slurry of 1.0 g. of sodium hydride in 10 ml. of dry diethyleneglycol dimethyl ethqr under a dry nitrogen atmosphere is slowly added 1.0 g. of 3-methoxy-17α-ethynylestra-1,3,5(10)-trien-17β-ol in 10 ml. of dry diethylne glycol dimethyl ether in a dropwise fashion over a 20 minute period. To this mixture is added dropwise, 0.9 g. of 2-chlorotetrahydropyran over a 10 minute period.

The mixture is stirred at room temperature for an additional 30 minutes and then cautiously added to an icewater mixture with stirring. The organic phase is extracted with diethyl ether, dried and evaporated under reduced pressure to yield 3-methoxy-17α-ethynyl-17β-tetrahydropyran-2'-yloxyestr-1,3,5(10)-triene which may be further pruified via recrystallization from acetone:hexane.

Two milliliters of dihydropyran are added to a solution of 1 g. of 3-methoxy-17α-ethynylestra-1,3,5(10)-trien-17β-ol-3-one in 15 ml. of benzene. About 1 ml. is removed by distillation to remove moisture and 0.4 g. of p-toluene-sulfonic acid is added to the cooled solution. This mixture is allowed to stand at room temperature for 4 days, and is then washed with aqueous sodium carbonate solution and water, dried and evaporated. The residue is chromatographed on netural alumina, eluting with hexane, to yield 3-methoxy-17α-ethynyl-17β-tetrahydropyran-2'-yloxyestra-1,3,5(10)-tirene which is recrystallized from pentane.

A solution of 2.5 grams of phenyllithium in 25 ml. of diethyl ether is prepared. While maintaining this solution at room temperature, 10 grams of 3-methoxy-17α-ethynyl-17β-tetrahydropyran-240 -yloxyestr-1,3,5(10)-triene are added thereto to provide a solution containing 3-methoxy-17α-ethynyllithium-17β-tetrahydropyran-2'-yloxyestr-1,3,5(10)-triene. To the resulting solution is added, portionwise and with stirring, 3 grams of paraformaldehyde. The addition is conducted at a rate to maintain gentle reflux of the solution. After the addition, the mixture is stirred for 20 hours, and then poured into water and extracted with ether. The ether is washed with water, dried and evaporated to obtain the 3-methoxy-17α-(3-hydroxypropynyl)-17β-tetrahydropyran-2'-yloxyestr-1,3,5(10)-triene product.

3-Methoxy-17α-(3-hydroxypropynyl)-17β-tetrahydro-pyran-2'-yloxyestra-1,3,5(10)-triene (1 g.) is dispersed in 50 ml. of anhydrous ether at room temperature with stirring. To the resultant solution is added 1.5 ml. of purified thionyl chloride. The addition is conducted portionwise at 0°C. The resulting reaction mixture is then allowed to stand at 0°C. for a period of 6 minutes after which time it is washed with aqueous sodium bicarbonate solution followed by water. The washed material is then dried over sodium sulfate and evaporated to dryness to obtain the 3-methoxy-17α-(3-chloropropynyl)-17β-tetrahydropyran-2'-yloxyestra-1,3,5(10)-triene product which is recrystallized from ether:ethyl acetate.

Alternatively, the 17α-(3-chloropropynyl) compound is prepared as described in Preparation 3.

To a solution of 1 g. of 3-methoxy-17α-(3-chloropropynyl)-17β-tetrahydropyran-2'-yloxyestra-1,3,5(10)-triene in 30 ml. of acetic acid is added 0.5 ml. of 2 N hydrochloric acid. The mixture is allowed to stand 5 hours at room temperature and then diluted with ice water and extracted with methylene chloride. The extracts are washed with water to neutrality, dried over sodium sulfate, and evaporated to dryness to yield 3-methoxy-17α-(3-chloropropynyl)-estra-1,3,5(10)-trien-17β-ol which is recyrstallized from acetone:hexane.

PREPARATION 3

Alternative to the procedures described in Preparations 1 and 2, the following can be employed to prepare the 3-chloropropynyl compounds:

A solution of 17α-(3-hydroxypropynyl)-17β-acetoxyestr-4-en-3-one (3.5 g.) and triphenylphosphine (4.2 g.) in dimethylformamide (26.7 ml.) containing carbon tetrachloride (1.1 ml) is heated at 110°for 15 minutes and then the solvent is evaporated under reduced pressure. The residue is dissovled in hexane-ether (3:1) and chromatographed on 140 g. of silica gel. Elution with ether-hexane (2:1) and crystallization of the pooled crystalline fractions from hexane furnishes 17α-(3-chloropropynyl)-17β-acetoxyestr- 4-en-3-one.

In accordance with the above procedure, 17α-(3-chloropropynyl)-estr-4-en-17α-ol-3-one is prepared from 17α-(3-hydroxypropynyl)-estr-4-en-17β-ol-3-one.

Similarly, 17α-(3-chloropropynyl)-17β-acetoxy-18-methylestr-4-en-3-one, 6,6-difluoro-17α-(3-chloropropynyl)-17β-acetoxy-estr-4-en-3-one, and 6,6-difluoro-17α-(3-chloropropynyl)-17β-acetoxy-18-methylestr-4-en-3-one are prepared. Base hydrolysis thereof affords the corresponding 17β-ols or the chlorination can be performed on the 17β-ol.

PREPARATION 4

17α-(3-Hydroxypropynyl)-estr-4-en-17β-ol-3-one (1.5 g.) is dissovled into 75 ml. of toluene. The resulting solution is mixed with 2 g. of benzene sulfonyl fluoride. The reaction mixture is then heated to a temperature ranging from 80° to 90°C. and for a period of 4 hours. At the end of this reaction period, the mixture is cooled and then poured into ice water. The organic layer is then washed with a sodium bicarbonate solution and then with water and, following the washings, is dried over sodium sulfate. Solvent is then removed by evaporation and the remaining residue is recrystallized from ether ot obtain the 17α-(3-fluoropropynyl)-estr-4-en-17β-ol-3-one product.

By use of 17α-(3-hydroxypropynyl)-17β-acetoxyestr-4-en-3-one, 17α-(3-fluoropropynyl)-17β-acetoxyestr-4-en-3-one is prepared which can be hydrolyzed to the 17β-ol.

Alternatively, the 3-fluoropropynyl compounds, prepared as described above, are prepared by the following representative procedure:

A solution of 1 g. of 17α-(3-hydroxypropynyl)-17β-acetoxyestr-4-en-3-one in 100 ml. of anhydrous methylene dichloride and 1 g. of 1-diethylamino-1,1,2-trifluoro-2-chloroethane is allowed to stand at room temperature for 48 hours. The reaction mixture is then filtered through alumina, eluting with hexane, to give 17α-(3-fluoropropynyl)-17β-acetoxyestr-4-en-3-one which can be recrystallized from acetone:hexane.

Alternatively, the above method is practiced in acetonitrile at room temperature for about 24 hours or with tetrahydrofuran at reflux for about 1 hour.

PREPARATION 5

A solution of 3-tetrahydropyran-2'-yloxyprop-1-yne (7.1 g.) in dry tetrahydrofuran (50 ml.) is added to a solution of ethylmagnesium bromide prepared from ethyl bromide (4.0 g.) and magnesium turnings (0.9 g.) in tetrahydrofuran (75 ml.). The reaction mixture is heated under reflux for 5 minutes and after being allowed to stand at room temperature for 30 minutes it is treated with a solution of 3-ethoxyestra-3,5-dien-17-one (5.0 g.) in dry tetrahydrofuran (65 ml.). After 8 hours, acetyl chloride (20 ml.) is added and the reaction mixture is kept at room temperature for 18 hours and then poured into water. The crude product, isolated by extraction with methylene dichloride, is dissolved in methanol (15 ml.) containing 0.25 ml. of concentrated hydrochloric acid and the resulting solution heated under reflux for 10 minutes. Addition of water (200 ml.) and isolation by extraction with methylene dichloride furnishes a crystalline solid which is purified by chromatography over Florisil (200 g.). Elution with ethyl acetate-hexane (1:4) gives 17α-(3-hydroxypropynyl)-17β-acetoxyestr-4-en-3-one after crystallization from ether.

The thus prepared compound is treated in accordance with the chlorination procedures of Preparation 2 or Preparation 3 to give 17α-(3-chloropropynyl)-17β-acetoxyestr-4-en-3-one. In a similar manner but with elimination of the acetyl chloride treatment step, 17α-(3-chloropropynyl)-estr-4-en-17β-ol-3-one is prepared.

In accordance with the above procedures, 17α-(3-chloropropynyl)-17β-acetoxy-18-methylestr-4-en-3-one, 17α-(3-chloropropynyl)-18-methylestr-4-en-17β-ol-3-one, 6,6-difluoro-17α-(3-chloropropynyl)-17β-acetoxyestr-4-en-3-one, 6,6-difluoro-17α-(3-chloropropynyl)-estr-4-en-17β-ol-3-one, 6,6-difluor-17α-(3-chloropropynyl)-17β-acetoxy-18-methylestr-4-en-3-one, and 6,6-difluoro-17α-(3-chloropropynyl)-18-methylestr-4-en-17β-ol -3-one are prepared from the respective starting compounds. The 17β-ol compounds can also be prepared upon final base hydrolysis of the 17β-acetate products.

PREPARATION 6

17α-(3-Bromopropynyl)-androst-4-en-17β-ol is prepared by substituting thionyl bromide for thionyl chloride in Preparations 1 and 2 and by substituting carbon tetrabromide for carbon tetrachloride in Preparation 3. This can be acetylated to the 17β-acetate. Likewise, by employing the appropriate starting compounds, the corresponding 18-methyl, -ethyl, and -propyl derivatives are prepared. Similarly, these procedures are applicable in the preparation of the 17α-(bromopropynyl) derivatives in the estrogen and estrane series.

PREPARATION 7

To a suspension of 1 g. of estr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxyestra-3,5-dien-17-one which is recrystallized from acetone:hexane.

A stream of perchloryl fluoride is passed through a solution of 1 g. of 3-ethoxyestra-3,5-dien-17-one in 25 ml. of dimethylformamide, cooled to 0°C., for 5 minutes. After being allowed to slowly attain a temperature of 20°C, the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15°C. The mixture is poured into cold water and the solid which forms is collected by filtration, washed with water and dried to yield 6α-fluoroestr-4-ene-3,17-dione which is recrystallized from acetone:hexane.

To a suspension of 1 g. of 6α-fluoroestr-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-6-fluoroestra-3,5-dien-17-one which is recrystallized from acetone:hexane.

A stream of perchloryl fluoride is passed through a solution of 1 g. of 3-ethoxy-6-fluoroestra-3,5-dien-17-one in 25 ml. of dimethylformamide, cooled to 0°C., for 5 minutes. After being allowed to slowly attain a temperature of 20°C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to provide the 6,6- difluoroestr-4-ene-3,17-dione product on recrystallization from acetone:hexane.

In like manner, 6,6-difluoroandrost-4-ene-3,17-dione, 6,6-difluoro-18-methylestr-4-ene-3,17-dione, 6,6-difluoro-18-methylandrost-4-ene-3,17-dione, 6,6-difluoro-18ethyl-estr-4-ene-3,17-dione, 6,6-difluoro-18-ethylandrost-4-ene-3,17-dione, 6,6-difluoro-18-propylestr-4-ene-3,17-dione and 6,6-difluoro-18-propylandrost-4-ene-3,17-dione are prepared from the respective starting compound.

PREPARATION 8

A solution of 2 g. of 6,6-difluoroestr-4-ene-3,17-dione in 20 ml. of anhydrous tetrahydrofuran is cooled to −75°C. in dry ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 6,6-difluoroestr-4-ene-3,17$\beta$-diol.

A mixture of 3 g. of 6,6-difluoroestr-4-ene-3$\beta$17$\beta$-diol, 10 ml. of pyridine and 0.9 ml. of acetic anhydride is allowed to stand at room temperature for 15 hours. The mixture is then poured into ice water and the solid which forms is collected by filtration, washed with water and dried to yield 3$\beta$,17$\beta$-diacetoxy-6,6-difluoroestr-4-ene; 3$\beta$-acetoxy-6,6-difluoroestr-4-en-17$\beta$-ol, and 6,6-difluoro-17$\beta$-acetoxyestr-4-en-3$\beta$-ol which are separated by chromatography on alumina.

A solution of 6 g. of 3$\beta$-acetoxy-6,6-difluoroestr-4-en-17$\beta$-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3$\beta$-acetoxy-6,6-difluoroestr-4-en-17-one which may be further purified by recrystallizaton from acetone: hexane.

In like manner, 3$\beta$-acetoxy-6,6-difluoro-18-methylestr-4-en-17-one is prepared from 6,6-difluoro-18-methylestr-4-ene-3,17-dione.

The thus-prepared compounds are treated in accordance with the procedures set forth in Preparations 1, paragraphs 3 and 4 to prepare the 3$\beta$,17$\beta$-diacetoxy-6,6-difluoro-17$\alpha$-(3-hydroxypropynyl)-estr-4-ene
which is converted to the corresponding 17$\alpha$-(3-halopropynyl) derivatives via the procedures set forth in Preparations 1, 2, 3, 4, 6, and 16. Thus prepared are 3$\beta$,17$\beta$-diacetoxy-6,6-difluoro-17$\alpha$-(3-halo-propynyl)-estr-4-ene and 3$\beta$,17$\beta$-diacetoxy-6,6-difluoro- 17$\alpha$-(3-halopropynyl)-18-methylestr-4-ene. Also thus prepared is 3$\beta$,17$\beta$-diacetoxy-6,6-difluoro-17$\alpha$-(3-halopropynyl)-androst-4-ene.

Substitution of an alternate carboxylic acid anhydride in the above procedures affords the correspoinfing diacylates, for example, the propionates, benzoates, pentanoates, and adamantoates, for example, 3$\beta$,17$\beta$-dipropionyloxy-6,6-difluoro-17$\alpha$-(3-halopropynyl)-estr-4-ene, 3$\beta$,17$\beta$-dipropionyloxy-6,6-difluoro-17$\alpha$-(3-halopropynyl)-18-methylestr-4-ene, 3$\beta$,17$\beta$-acetoxy-6,6-difluoro-17$\alpha$-(3-halopropynyl)-18-ethylestr-4-ene, 3$\beta$,17$\beta$-dipropionyloxy-6,6-difluoro-17$\alpha$-(3-halopropynyl)-androst-4-ene, 3$\beta$,17$\beta$-dibenzoyloxy-17$\beta$-(3-halopropynyl)-estr-4-ene, 3$\beta$,17$\beta$-dibenzoyloxy-6,6-difluoro-17$\beta$-(3-halopropynyl)-estr-4-ene, 3$\beta$,17$\beta$-dibenzoyloxy-6,6-difluoro-17$\alpha$-(3-halopropynyl)-18-methylestr-4-ene, and 3$\beta$,17$\beta$-dibenzoyloxy-17$\alpha$-(3-halopropynyl)-18-methylandrost-4-ene.

PREPARATION 9

A solution of 1 gram of sodium borohydride in 3 ml. of water is added to an ice-colled solution of 1 gram of 6,6-difluoroestr-4-ene-3,17-dione in 120 ml. of methanol and the mixture is then allowed to stand for 16 hours at room temperature. The excess reagent is decomposed by the addition of acetic acid and the solution is then concentrated to a small volume in vacuum and diluted with water. The product is extracted with ethyl acetate and these extracts are washed with water, dried and evaporated to yield 6,6-difluoroestr-4-ene-3$\beta$,17$\beta$-diol which may be further purified by recrystallization from acetone:hexane.

To a slurry of 1.0 g. of sodium hydride in 10 ml. of dry diethyleneglycol dimethyl ether under a dry nitrogen atmosphere is slowly added 1.0 g. of 6,6-difluoroestr-4-ene-3$\beta$,17$\beta$-diol in 10 ml. of dry diethyleneglycol dimethyl ether in a dropwise fashion over a 20 minute period. To this mixture is added dropwise, 0.9 g. of 2-chlorotetrahydropyran over a 10 minute period. The mixture is stirred at room temperature for an additional 30 minutes and then cautiously added to an ice-water mixture with stirring. The organic phase is extracted with diethyl ether, dried and evaporated under reduced pressure to yield 3$\beta$,17$\beta$-bis-(tetrahydropyran-2'-yloxy)-6,6-difluoroestr-4-ene; 3$\beta$-tetrahydropyran-2'-yloxy-6,6-difluoroestr-4-en-17$\beta$-ol; and 6,6-difluoro-17$\beta$-tetrahydropyran-2'-yloxyestr-4-en-3$\beta$-ol, which are separated by chromatography on alumina.

Substitution of dihydrofuran in the above procedure prepares the corresponding tetrahydrofuran-2'-yloxy derivatives.

A solution of 6 g. of 3$\beta$-tetrahydropyran-2'-yloxy-6,6-difluoroestr-4-en-17$\beta$-ol in 120 ml. of pyridine is added to a mixture of 5 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3$\beta$-tetrahydropyran-2'-yloxy-6,6-difluoroestr-4-en-17-one which may be further purified by recrystallization from acetone:hexane.

To a solution of 1 gram of lithium aluminum hydride in 100 ml. of anhydrous tetrahydrofuran is continuously bubbled a slow current of purified acetylene for one hour. Thereafter, 1 gram of 3$\beta$-tetrahydropyran-2'-yloxy-6,6-difluoroestr-4-en-17-one in 10 ml. of tetrahydrofuran is added and the reaction mixture stirred at room temperature for four hours. Eight milliliters of water is then added and the mixture is stirred for 30 minutes. The mixture is then filtered and the organic filtrate evaporated to yield 3β-tetrahydropyran-2'-yloxy-6,6-difluoro-17α-ethynylestr-4-en-17β-ol which is recrystallized from acetone:hexane.

In a similar manner, 3β-tetrahydrofuran-2'-yloxy-6,6-difluoro-17α-ethynylestr-4-en-17β-ol is prepared.

The thus prepared 3β-tetrahydropyran-2'-yloxy-6,6-difluoro-17α-ethynylestr-4-en-17β-ol and 3β-tetrahydrofuran-2'-yloxy-6,6-difluoro-17α-ethynylestr-4-en-17β-ol compounds are then treated in accordance with the procedure of Preparation 2 (paragraph 4) followed by the halogenation procedures set forth in Preparations 1 to 4, 6, or 16 to respectively form 3β-tetrahydropyran-2'-yloxy-6,6-difluoro-17α-(3-halopropynyl)-estr-4-en-17β-ol and 3β-tetrahydrofuran-2'-yloxy-6,6-difluoro-17α-(3-halopropynyl)-estr-4-en-17β-ol.

The thus prepared 3β-monoethers can be then acylated as described in Preparation 8 above to prepare the mixed ester-ether derivatives. Thus formed, for example, are 3β-tetrahydropyran-2'-yloxy-6,6-difluoro-17α-(3-halopropynyl)-17β-acetoxyestr-4-ene, 3β-tetrahydrofuran-2'-yloxy-6,6-difluoro-17α-(3-halopyopynyl)-17β-acetoxyestr-4-ene, 3β-tetrahydropyran-2'-yloxy-6,6-difluoro-17α-(3-halopropynyl)-17β-acetoxyandrost-4-ene, 3β-tetrahydrofuran-2'-yloxy-6,6-difluoro-17α-(3-halopropynyl)-17β-acetoxyandrost-4-ene, 3β-tetrahydropyran-2'-yloxy-6,6-difluoro-17α-(3-halopropynyl)-17β-propionyloxyestr-4-ene, 3β-tetrahydrofuran-2'-yloxy-6,6-difluoro-17α-(3-halopropynyl)-17β-propionyloxyestr-4-ene, 3β-tetrahydropyran-2'-yloxy-6,6-difluoro-17α-(3-halopropynyl)-17β-propionyloxyandrost-4-ene, 3β-tetrahydrofuran-2'-yloxy-6,6-difluoro-17α-(3-halopropynyl)-17β-caproyloxyestr-4-ene, 3β-tetrahydropyran-2'-yloxy-6,6-difluoro-17α-(3-halopropynyl)-17β-carproyloxyestr-4-ene, 3β-tetrahydrofuran-2'-yloxy-6,6-difluoro-17α-(3-halopropynyl)-17β-caproyloxyestr-4-ene, 3β-tetrahydropyran-2'-yloxy-6,6-difluoro-17α-(3-haloprolpynyl)-17β-caproyloxyestr-4-ene, 3β-tetrahydrofuran-2'-yloxy-6,6-difluoro-17α-(3-halopropynyl)-17β-caproyloxyandrost-4-ene, and so forth.

PREPARATION 10

The compound 3β-acetoxy-6,6-difluoroestr-4-en-17-one is treated in accordance with the procedure set forth in paragraph 5 of Preparation 9 to prepare 3β-acetoxy-6,6-difluoro-17α-ethynylestr-4-en-17β-ol. This derivative is then etherified in accordance with the procedure set forth in paragraphs 2 or 3 or Preparation 9 to respectively prepare the corresponding 3β-acetoxy-6,6-difluoro-17α-ethynyl-17η-tetrahydropyran-2'-yloxyestr-4-ene and 3β-acetoxy-6,6-difluoro-17α-ethynyl-17β-tetrahydrofuran-2'-yloxyestr-4-ene.

In like manner, the foregoing procedures can be followed with the other starting 3β-acylates described in the foregoing procedures.

PREPARATION 11

Two milliliters of dihydropyran are added to a solution of 1 g. of 6,6-difluoro-17α-ethynylestr-4-en-17β-ol-3-one in 15 ml. of benzene. About 1 ml. is removed by distillation to remove moisture and 0.04 g. of p-toluenesulfonic acid is added to the cooled solution. This mixture is allowed to stand at room temperature for 4 days, and is then washed with aqueous sodium cargonate solution and water, dried and evaporated. The residue is chromatographed on neutral alumina, eluting with hexane, to yield 6,6-difluoro-17α-ethynyl-17β-tetrahydropyran-2'-yloxyestr-4-en-3-one which is recrystallized from pentane.

A solution of 2 g. of 6,6-difluoro-17α-ethynyl-1762-tetrahydropyran-2'-yloxyestr-4-en-3-one in 20 ml. of anhydrous tetrahydrofuran is cooled to −75°C. in a dry ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes, it is cooled and poured into ice water and extracted several times with ethyl acetate. These extracts are washed with water to neutrality, dried over anhydrous sodium sulfate and evaporated to dryness to yield 6,6-difluoro--b 17α-ethynyl-17β-tetrahydropyran-2'-yloxyestr-4-en-3β-ol.

To a slurry of 1.0 g. of sodium hydride in 10 ml. of dry diethyleneglycol dimethyl ether under a dry nitrogen atmosphere is slowly added 1.0 g. of 6,6-difluro-17α-ethynyl-17β-tetrahydropyran-2'-yloxyestr-4-en-3β-ol in 10 ml. of dry diethyleneglycol diemthyl ether in a dropwise fashion over a 20 minute period. To this mixture is added dropwise, 0.9 g. of 2-chlorotetrahydropyran over a 10 minute period.

The mixture is stirred at room temperature for an additional 30 minutes and then cautiously added to an ice-water mixture with stirring. The organic phase is extracted with diethyl ether, dried and evaporated under reduced pressure to yield 3β,17β-bistetrahydropyran-2'-yloxy-6,6-difluoro-17α-ethynylestr-4-ene which may be further purified via recrystallization from acetone:hexane.

Two milliliters of dihydropyran are added to a solution of 1 g. of 6,6-difluoro-17α-ethynyl-17β-tetrahydropyran-2'-yloxyestr-4-en--3β-ol in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous soduim carbonate solution and water, dried and evaporated. The residue is chromatographed on neutral alumina, eluting with hexane, to yield 3β,17β-bistetrahydropyran-2'-yloxy-6,6-difluoro-17α-ethynylestr-4-ene which is recrystallized from pentane.

The thus prepared compound is then treated in accordance with the procedure set forth, for example, in Preparation 2, paragraph 4 to give 3β,17β-bistetrahydropyran-2'-yloxy-6,6-difluoro-17α-(3-hydroxypropynyl)-estr-4-ene which is, in turn, halogenated via the procedures described in Preparations 1 to 4, 6, and 16 to give the corresponding 17α-(3-halopropynyl) compounds, e.g., 3β,17β-bistetrahydropyran-2'-yloxy-6,6-difluoro-17α-(3-chloropropynyl)-estr-4-ene, and 3β,17β- bistetrahydropyran-2'-yloxy-6,6-difluoro-17α-(3-bromopropynyl)-estr14-ene, and 3β,17β-bistetrahydropyran-2'-yloxy-6,6-difluoro-17α-(3-fluoropropynyl)-estr-4-ene.

PREPARATION 12

One gram of estr-5(10)-ene-3,17-dione is suspended in 10 ml. of anhydrous methanol containing 0.16 ml. of perchloric acid (70 percent) per liter of methanol. The reaction mixture is stirred at room temperature and under anhydrous conditions overnight. Solid sodium methoxide is then added and the reaction mixture is then slowly diluted with from 5 to 10 times its volume with water. The mixture is then filtered to give 3,3-dimethoxyestr-5(10)-en-17-one which can be recrystallized from methylene chloride:methanol containing a trace of triethylamine.

The thus prepared compound is then treated in accordance with the procedures of Preparation 1 to give 3,3-dimethoxy-17α-(3-tetrahydropyran-2'-yloxypropynyl)-estr-5(10)-en-17β-ol.

One gram of 3,3-dimethoxy-17α-(3-tetrahydropyran-2'-yloxypropynyl)-estr-5(10)-en-17β-ol is dispersed in 45 ml. of acetone containing 0.05 mg. of malonic acid in 5 ml. of water and the resultant mixture is allowed to stand at room temperature overnight. After this time, it is poured into dulute aqueous potassium bicarbonate solution and extracted with ether. The extracts are dried and evaporated to give 17α-(3-hydroxypropynyl)-estr-5(10)-en-17β-ol-3-one.

The thus prepared compound is then halogenated as described above, with or without prior conversion to the 17β-acetate, to give the corresponding 3-halopropynyl compounds, e.g., 17α-(3-chloropropynyl)-estr-5(10)-en-17β-ol-3-one.

The foregoing hydrolysis can be practiced upon the product of Preparation 11 to give 6,6-difluoro-17α-(3-chloropropynyl)-estr-4-ene-3β,17β-diol. 6,6-Difluoro-17α-(3-bromopropynyl)-estr-4-ene-3β,17β-diol and 6,6-difluoro-17α-(3-iodo- or fluoropropynyl)-estr-4-ene-3β,17β-diol are also thus prepared from the respective halo starting compounds.

One gram of 6,6-difluoro-17α-(3-chloropropynyl)-ester-4-ene-3β,17β-diol in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield 6,6difluoro-17α-(3-chloropropynyl)-estr-4-en-17β-ol-3-one which may be further purified through recrystallization from acetone-hexane.

Similarly, 6,6-difluoro-17α-(3-bromopropynyl)-estr-4-en-17β-ol-3-one and 6,6-difluoro-17α-(3-iodo- or fluoropropynyl)-estr-4-en-17β-ol-3-one are prepared. The corresponding 17β-acetates thereof are prepared by treatment of the 17β-ol with acetic and acetic anhydride in the presence of p-toluenesulfonic acid in the manner known per se.

PREPARATION 13

A mixture of 1 g. of 17β-acetoxyestr-4-en-3-one, 25 ml. of dry benzene, 5 ml. of ethylene glycol, and 50 mg. of p-toluenesulfonic acid monohydrate is refluxed for 16 hours using a water separator. The reaction mixture is then washed with aqueous sodium bicarbonate solution and water, dried and evaporated to dryness. The resultant residue is chromatographed on alumina eluting with hexane:benzene and pure benxene to yield 3,3-ethylenedioxy-17β-acetoxyestr-5(10)-ene which is recrystallized from acetone:hexane.

To a solution of 1.0 g. of 3,3-ethylenedioxy-17β-acetoxyestr-5(10)-ene in 50 ml. of benzene is added 0.2 g. of magnesium sulfate. Thee mixture is heated at reflux for 40 minutes, neutralized with a saturated aqueous sodium carbonate solution, concentrated under reduced pressure to about 20 ml. and poured into water. The solid which forms is collected by filtration, washed well with with water, and dried to yield 17β-acetoxyestr-5(10)-en-3-one which may be recrystallized from acetone.

One gram of 3,3-ethylenedioxy-17β-acetoxyestr-5(10)-ene 10)- is dispersed in 45 ml. of acetone containing 0.05 mg. of malonic acid in 5 ml. of water and the resultant mixture is allowed to stand at room temperature overnight. After this time it is poured into dilute aqueous potassium bicarbonate solution and extracted with ether. The extracts are dried and evaporated to give 17β-acetoxyestr-5(10)-en-3-one.

To a solution of 0.2 g. of 17β-acetoxyestr-5(10)-en-3-one in 4 ml. of pyridine is added 1.1 g. of pyridine perbromide hydrobromide. The mixture is stirred at room temperature for 7 hours after which time it is partitioned between water and ethyl acetate and the organic phase separated. This is washed successively with dilute hydrochloric acid, dilute sodium bicarbonate solution, dried and evaporated. The resultant solid is chromatographed on alumina eluting with benzene:ether and pure benzene to give 17β-acetoxyestra-4,9(10)-dien-3-one.

A solution of 1 g. of 17β-acetoxyestra-4,9(10)-dien-3-one in 50 ml. of methanol is heated at reflux for 3 hours with a solution of potassium hydroxide in 1 ml. of water. The reaction mixture is then poured into ice water and the solid which forms collected by filtration, washed with water to neutrality and dried to yield estra-4,9(10)-dien-17β-ol-3-one which is recrystallized from methylene chloride:ether.

A solution of 6 g. of estra-4,9(10)-dien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate, and filtered through water, dried and evaporated to dryness to yield estra-4,9-(10)-diene-3,17-dione which may be further purified by recrystallization from acetone:hexane.

Likewise, 18-methylestra-4,9(10)-diene-3,17-dione, 18-ethylestra-4,9(10)-diene-3,20-dione and 18-propylestra-4,9(10)-diene-3,17-dione are prepared.

Estra-4,9(10)-dien-17β-ol-3-one (2 g.) is added to a solution of hydrogen chloride (1g.) in methanol (100 ml.). After 15 minutes at room temperature, the solution is cooled in ice and is neutralized with powdered sodium methoxide. Methylene chloride (300 ml.) is then added and the mixture is washed several times with water. The dried solvent is evaporated and the residue is exahustively extracted with boiling n-hexane. The extract is chromatographed on Florisil (50 g.). The column is eluted with 1, 2, 3, and 4 percent acetone in petroleum ether (b.p. 30°–60°). The residue eluted in the latter is dissolved in acetone (40 ml.) and the solution is treated with sulfuric acid (0.5 ml.; 8 percent). After 5 minutes, the mixture is diluted with water and the crystals which separate are collected, washed with water, and dried. Recrystallization from n-hexane give the estra-5(10),9(11)-dien-17β-ol-3-one.

A solutuion of 6 g. of estra-5(10),9(11)-dien-17β-ol-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield estra-5(10),9(11)-diene-3,17-dione which may be further purified by recrystallization from acetone:hexane.

Likewise, 18-methylestra-5(10),9(11)-diene-3,17-dione 18-ethylestra-5(10),9(11)-dien-3,17-dione, and 18-propylestra-5(10),9(11)-diene-3,17-dione are prepared.

A mixture of 2.0 g. of estra-4,9(10)-diene-3,17-dione 100 ml. of dry benzene, 10 ml. of ethylene glycol and 250 mg. of p-toluenesulfonic acid monohydrate is refluxed under nitrogen for 6 hours. The reaction mixture is then washed with benzene, aqueous sodium bicarbonate solution, and water, dried and evaporated to dryness to yield 3,3;17,17-bisethylenedioxyestra-5(10),9(11)-diene which is recrystallized from acetone:hexane.

The above procedure is repeated using estra-4,9(10)-dien-17β-ol-3-one to give 3,3-ethylene dioxyestra-5(10),9(11)-dien-17β-ol-3-one which is oxidized with Collins reagent as described above to give 3,3-ethylenedioxyestra-5(10),9(11)-dien-17-one.

To a solution of 1.75 g. of 3,3;17,17-bisethylenedioxyestra-5(10),9(11)-diene in 5 ml. of methylene chloride is added 1.2 g. of m-chloroperbenzoic acid. The reaction mixture is kept at room temperature for 20 minutes. The mixture is then extracted with methylene chloride, the extracts washed with dilute sodium bicarbonate solution and water, and evaporated to yield to oil.

The oil thus obtained is chromatographed on silica with 1:1 ethyl acetate:hexane and is then dissolved in 4 ml. of dioxane and treated at 25°C. with 0.05 ml. of perchloric acid (70 percent) for 20 minutes. Isolation via chromatography yields estra-4,9(10),11-triene-3,17-dione.

Similar results are obtained when perbenzoic acid is substituted for m-chloroperbenzoic acid in the epoxidation procedure. In like manner, sulfuric acid or other strong acid can be substituted in lieu of perchloric acid in the last procedure with successful results.

The oil obtained upon epoxidation as described above is alternately dissolved in 100 mg. of p-toluenesulfonic acid. The mixture is kept at room temperature for 20 hours and is then evaporated to an oily mixture containing the corresponding hydroxy derivatives. These latter derivatives may be isolated via chromatography or the oil may be treated with perchloric acid or other mineral acid as described above to similarly yield estra-4,9(10),11-triene-3,17-dione.

Like prepared by the procedures of this example is 18-methylestra4,9(10),11-triene-3,17-dione.

A solution of 2 g. of estra-4,9(10),11-triene-3,17-dione in 20 ml. of anhydrous tetrahydrofuran is cooled to −75°C. in a dry ice-acetone bath and treated with a previously cooled solution of 0.6 g. of lithium tri-t-butoxy aluminum hydride in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield estra-4,9(10),11-triene-3β,17β-diol.

A mixture of 1 g. of estra-4,9(10),11-triene-3β,17β-diol 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxyestra-4,9(10),11-trien-17β-ol which is recovered by chromatography on silica gel.

A solution of 6 g. of 3β-acetoxyestra-4,9(10),11-trien-17β-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 3β-acetoxyestra-4,9(10),11-trien-17-one which may be further purified by recrystallization from acetone:hexane.

Also thus prepared are 3β-acetoxy-18-methylestra-4,9(10),-trien-17One and 3β-acetoxy-18-ethylestra-4,9(10),-trien-17-one and 3β-acetoxy-18-propylestra-4,9(10),11-trien-17-one.

PREPARATION 14

A mixture of 1 g. of estra-4,9(10)-diene-3,17-dione, 75 ml. of dry benzene, 5 ml. of ethylene glycol and 2 g. of oxalic acid dihydrate is refluxed for 16 hours using a water separator. The reaction mixture is then washed with aqueous sodium bicarbonate solution and water, dried and evaporated to dryness to yield 3,3-ethylenedioxyestra-4,9(10)-dien-17-one which is recrystallized from acetone:hexane.

Alternatively, the above procedure can be employed using estra-4,9(10)-dien-17β-ol-3-one to give the 3,3-ethylene ketal followed by oxidation with Collins reagent to give 3,3-ethylenedioxyestra-4,9(10)-dien-17-one.

Likewise,
3,3-ethylenedioxy-18-methylestra-4,9(10)-dien-17-one,
3,3-ethylenedioxy-18-ethylestra-4,9(10)-dien-17-one,
3,3-ethylenedioxy-18-propylestra-4,9(10)-dien-17-one,
3,3-ethylenedioxyestra-5(10),9(11)-dien-17-one,
3,3-ethylenedioxy-18-methylestra-5(10),9(11)-dien-17-one,
3,3-ethylenedioxy-18-ethylestra-5(10),9(11)-diene-17-one,
3,3-ethylenedioxy-18-propylestra-5(10),9(11)-dien-17-one,
3,3-ethylenedioxyestra-4,9(10),11-trien-17-one,
3,3-ethylenedioxy-18methylestra-4,9(10),11-trien-17-one, 3,3-ethylenedioxy-18-ethylestra-4,9(10),11-trien-17-one, and
3,3-ethylenedioxy-18-propylestra-4,9(10),11-trien-17-one are prepared from the respective starting compounds.

One gram of estra-4,9(10)-diene-3,17-dione is suspended in 10 ml. of anhydrous methanol containing 0.16 ml. of perchloric acid (70 percent) per liter of methanol. The reaction mixture is stirred at room temperature and under anhydrous conditions overnight. Solid sodium methoxide is then added and the reaction mixture is then slowly diluted with from 5 to 10 times its volume with water. The mixture is then filtered to give 3,3-dimethoxyestra- 4,9(10) -dien-17-one which can be recrystallized from methylene chloride:methanol containing a trace of triethylamine.

Likewise, the 3,3-dimethoxy compounds otherwise corresponding to those listed in paragraph three hereof are prepared.

The compounds prepared as described in Preparations 13 and 14 are treated in accordance with the procedures of Preparations 1 to 9 to give:

17α-(3-tetrahydrofuran-2'-yloxypropynyl)estra-4,9(10),1-trien-17β-ol-3-one,
17α-(3-tetrahydrofuran-2'-yloxypropynyl)estra-4,9(10) -dien-17β-ol-3-one,
17α-(3-tetrahydrofuran-2'-yloxypropynyl)estra-5(10), 9(11)-dien-17β-ol-3-one,
17α-(3-tetrahydropyran-2'-yloxypropynyl)estra-4,9(10), 11-trien-17β-ol-3-one,
17α-(3-tetrahydropyran-2'-yloxypropynyl)estra-4,9(10)-dien-17α-ol-3-on,
17α-(3-tetrahydropyran-2'-yloxypropynyl)estra-5(10),9b(11)-dien-17β-ol-3-one,
17α-(3-(4'-methoxytetrahydropyran-4'-yloxy)propynyl)-estra-4,9(10),11-trien-17β-ol-3-one,
17α-(3-(4'-methoxytetrahydropyran-4'-yloxy)propynyl)-estra-4,9(10) -dien-17β-ol-3-one,
17α-(3-(4'-methoxytetrahydropyran-4'-yloxy)-propynyl)-estra-5(10),9(11)-dien-17β-ol-3one,
17α-(3-tetrahydrofuran-2'-yloxypropynyl)-18-methylestra-4,9(10),11-trien-17β-ol-3one,
17α-(3-tetrahydrofuran-2'-yloxypropynyl)-18-methylestra-4,9(10) -dien-17β-ol-3-one,
17α-tetrahydrofuran-2'-yloxypropynyl)-18-methylestra- 5(10)9(11)-dien-17β-ol-3-one,
17α-tetrahydropyran-2'-yloxypropynyl)-18-methylestra-4,9(10),11-trien-17β-ol-3-one,
17α-tetrahydropuran-2'-yloxypropynyl)-18-methylestra-4,9(10) -dien-17β-ol-3-one.
17α-tetrahydropyran-2'-yloxypropynyl)-18-methylestra-5(10) 9(11) -dien-17β-ol-3-one,
17α-(3-(4'-methoxytetrahydropyran-4'-yloxy)-propynyl)-18-methylestra-4,9(10),11-trien-17β-ol-3-one,
17α-(3-(4'-methoxytetrahydropyran-4'-yloxy)-propynyl)-18-methylestra-4,9(10)-dien-17β-ol-3-one,
17α-(3-(4'-methoxytetrahydropyran-4'-yloxy)-propynyl)-18-methylestra-5(10)9(11) -dien-17β-ol-3-one,
17α-(3-tetrahydrofuran-2'-yloxypropynyl)-18-ethylestra-4,9(10),11-trien-17β-ol-3-one,
17α-(3-tetrahydrofuran-2'-yloxypropynyl)-18-ethylestra-4,9(10)-dien-17β-ol-3-one,
17α-(3-tetrahydrofuran-2'-yloxypropynyl)-18-ethylestra-5(10)9(11)-dien-17β-ol-3-one,
17α-(3-tetrahydropyran-2'-yloxypropynyl)-18-ethylestra-4,9(10),11-trien-17β-ol-3-one,
17α-(3-tetrahydropyran-2'-yloxypropynyl)-18-ethylestra-4,9(10)-dien-17β-ol-3-one,
17α-(3-tetrahydropyran-2'-yloxypropynyl)-18-ethylestra-5(10)9(11) -dien-17β-ol-3-one,
17α-(3-(4'-methoxytetrahydropyran-4'-yloxy)propynyl)-18-ethylestra-4,9(10),11-trien-17β-ol-3-one,
17α-(3-(4'-methoxytetrahydropyran-4'-yloxy)propynyl)-18-ethylestra-4,9(10)-dien-17β-ol-3-one,
17α-(3-(4'-methoxytetrahydropyran-4'-yloxy)propynyl)-18-ethylestra-5(10)9(11) -dien- 17β-ol-3-one,
17α-(3-tetrahydrofuran-2'-yloxypropynyl)-18-propylestra-4,9(10),11-trien-17β-ol-3-one,
17α-(3-tetrahydrofuran-2'-yloxypropynyl)-18-propylestra-4,9(10)-dien-17β-ol-3-one,
17α-(3-tetrahydrofuran-2'-yloxypropynyl)-18-propylestra-5(10)9(11)-dien-17β-ol-3-one,
17α-(3-tetrahydropyran-2'-yloxypropynyl)-18-propylestra-4,9(10),11-trien-17β-ol-3-one,
17α-(3-tetrahydropyran-2'-yloxypropynyl)-18-propylestra-4,9(10)-dien-17β-ol-3-one,
17α-(3-tetrahydropyran-2'-yloxypropynyl)-18-propylestra-5(10)9(11)-dien-17β-ol-3-one,
17α-(3-tetrahydropyran-2'-yloxypropynyl)-18-propylestra-4,9(10),11-trien-17β-ol-3-one,
17α-(3-tetrahydropyran-2'-yloxypropynyl)-18-propylestra-4,9(10)-dien-17β-ol-3-one,
17α-(3-tetrahydropyran-2'-yloxypropynyl)-18-propylestra-5(10)9(11)-dien-17β-ol-3-one,
17α-(3-(4'-methoxytetrahydropyran-4'-yloxy)propynyl)-18-propylestra-4,9(10),11-trien-17β-ol-3-one,
17α-(3-(4'-methoxytetrahydropyran-4'-yloxy)propynyl)-18-propylestra-4,9(10)-dien-17β-ol-3-one,
17α-(3-(4'-methoxytetrahydropyran-4'-yloxy)propynyl)-18-propylestra-5(10)9(11)-dien-17β-ol-3-one,
17α-(3-halopropynyl)estra-4,9(10),11-trien-17β-ol-3-one,
17α-(3-halopropynyl)estra-4,9(10)-dien-17β-ol-3-one,
17α-(3-halopropynyl)estra-5(10)9(11)-dien-17β-ol-3-one,
17α-(3-halopropynyl)-18-methylestra-4,9(10),11-trien-17β-ol-3-one,
17α-(3-halopropynyl)-18-methylestra-4,9(10)-dien-17β-ol-3-one,
17α-(3-halopropynyl)-18-methylestra-5(10)9(11)-dien-17β-ol-3-one,
17α-(3-methylsulfonyloxypropynyl)estra-4,9(10), 11-trien-17β-ol-3-one,
17α-(3-methylsulfonyloxypropynyl)estra-4,9(10)-dien-17β-ol-3-one,
17α-(3-methylsulfonyloxypropynyl)estra-5(10) 9(11)-dien-17β-ol-3-one,
17α-(3-methylsulfonyloxypropynyl)-18-methylestra-4,9(10),11-trien-17β-ol-3-one,
17α-(3-methylsulfonyloxypropynyl)-18-methylestra-4,9(10)-dien-17β-ol-3-one,
17α-(3-methylsulfonyloxypropynyl)-18-methylestra-5(10)9(11)-dien-17β-ol-3-one, 17α-p-tolylsulfonyloxypropynyl)estra-4,9(10),11-trien-17β-ol-3-one,
17α-p-tolylsulfonyloxypropynyl)estra-4,9(10)-dien-17β-ol-3-one,
17α-p-tolylsulfonyloxypropynyl)estra-5(10)9(11)-dien-17β-ol-3-one,
17α-p-tolylsulfonyloxypropynyl)-18-methylestra-4,9(10),-trien-17β-ol-3-one,
17α-p-tolylsulfonyloxypropynyl)-18-methylestra-4,9(10)-dien-17β-ol-3-one,
17α-p-tolylsulfonyloxypropynyl)-18-methylestra-5(10)9(11)-dien-17β-ol-3-one, and so forth.

The foregoing 17β-hydroxy compounds can be esterified under conventional tertiary carbinol conditions to give the corresponding 17β-acetates thereof.

PREPARATION 15

Into a solution of 10 grams of 3,17-diacetoxy-18-methylestr-5-ene in 120 ml. of dry carbon tetrachloride which is maintained at 0°C. is slowly bubbled nitrosyl fluoride over a period of one-half hour. The reaction is monitored by tlc. After the reaction is complete, it is warmed until $NO_2$ is discharged. The reaction mixture is then washed with water and extracted with methylene chloride. The extracts are evaporated to dryness. The residue is recrystallized from acetone:hexane. The recrystallized material (or total crude) is percolated over 120 grams of aluminum oxide with benzene to give 3,17-diacetoxy-5α-fluoro-18-methylestran-6-one.

To a solution of 3.2 grams of 3,17-diacetoxy-5α-fluoro-18-methylestran-6-one in 40 ml. of methylene chloride are added 80 grams of sulfur tetrafluoride. The reaction mixture is allowed to stand at room temperature overnight, in a pressure flask. After this time, the reaction flask is vented and the reaction mixture is poured into ice water and washed with 5 percent aqueous sodium bicarbonate solution. The washed material is dried over sodium sulfate and evaporated to dryness, to give 3,17-diacetoxy-5α,6,6-trifluoro-18-methylestrane.

3,17-Diacetoxy-5α,6,6-trifluoro-18-methylestrane (2,6 g.) is dispersed in a solution of 50 ml. of methanol containing 4 ml. of concentrated hydrogen chloride. The resultant mixture is refluxed for 1.5 hours. It is then diluted with water and the methanol eliminated under reduced pressure. The mixture is then cooled to room temperature and filtered and the precipitate washed with water and air dried. The material is then dissolved in 50 ml. of acetone and treated with about 6 ml. of 8N chromic acid in sulfuric acid without cooling. The mixture is then diluted with water containing a trace of methanol and the solvent is then eliminated under reduced pressure. The solid is collected and air dried.

Two grams of the resultant solid is dispersed in 75 ml. of methanol containing 6 grams of sodium acetate and the resultant mixture is refluxed for 3 hours. The mixture is then diluted with water and the solvent eliminated under reduced pressure. The mixture is then cooled to room temperature and the solid collected by filtration and air dried to give 6,6-difluoro-18-methylestr-4-ene3,17-dione.

The compound thus obtained is treated with 6 ml. of ethylene glycol, 2 g. of oxalic acid, and 75 ml. of benzene under reflux with the use of a water separator for a period of 18 hours. The mixture is then poured over ice containing a saturated solution of potassium bicarbonate. The organic phase is separated and the water phase extracted two times with benzene. The organic extracts are combined and dried over anhydrous sodium sulfate and, after filtration, evaporated to dryness under reduced pressure. The residue is crystallized fractionally from acetone:hexane to give 3,3-ethylenedioxy-6,6-difluoro-18-methylestr-4-en-17-one.

The resultant compound is then treated in accordance with the first paragraph of Preparation 5 to give 3,3-ethylenedioxy-6,6-difluoro-17α-(3-hydroxypropynyl)-18-methylestr-4-en-17β-ol, after acetate hydrolysis. Alternatively, the 17β-acetate is preserved to give 3,3-ethylenedioxy-6,6-difluoro-17α-(3-hydroxypropynyl)-17β-acetoxy-18-methylestr-4-en-3-one. This compound, or the 17β-ol, can be converted to the corresponding 17α-(3-chloropropynyl) compounds by the method of Preparation 3.

These compounds (ie., the 17α-(3-hydroxy- or -chloro-propynyl) can be ketalized as set forth in Preparation 12, paragraph 1 or Preparation 14, paragraph 1. The 3,3-dimethoxy and 3,3-ethylenedioxy compounds in the 17α-(3-hydroxypropynyl) series can then be chlorinated (Preparation 3) to give the coresponding 17α-(3-chloropropynyl)-6,6-difluoro ketal products, e.g.

3,3-ethylenedioxy-6,6-difluoro-17α-(3-chloropropynyl)-18-methylestr-4-en-17β-ol-3-one and
3,3-dimethoxy-6,6-difluoro-17α-(3-chloropropynyl)-18-methylestr-4-en-17β-ol-3-one and the 17β-acetates thereof.

In like manner the corresponding compounds in the 13-methyl series are prepared.

PREPARATION 16

The following procedures illustrate the manner by which the 17α-(3-iodopropynyl) starting compounds are prepared by halogen exchange with sodium iodide.

A mixture of 1 gram of 17α-(3-bromopropynyl)-17β-acetoxyestr-4-en-3-one in 50 ml. of dry methylethyl ketone containing 1 g. of sodium iodide is refluxed for 10 hours. After this time, the reaction mixture is poured into water and the resultant mixture extracted with ether. The ether extracts are washed with water, dried, and evaporated at 20°C. in vacuum to give 17α-(3-iodopropynyl)-17β-acetoxyestr-4en-3-one.

In like manner, the 17α-(3-chloropropynyl) starting compounds are converted to the corresponding 17α-(3-iodopropynyl) compounds. The foregoing reaction is repeated using acetone in lieu of methylethyl ketone, with similar results.

EXAMPLE 1

The components 5 g. of 17α-(3-chloropropynyl)-17β-acetoxyestr-4-en-3-one, 25 g. of zinc dust, and 400 ml. of glacial acetic acid are mixed together at room temperature with stirring. The resultant mixture is then warmed to 50° for 2 hours while maintaining the stirring. At the end of this time, the mixture is filtered through Celite. The filtrate is collected and concentrated to a small volume under reduced pressure. The concentrate is cooled and diluted with ice water which precipitates a solid material. The solid material is collected by filtration and recrystallized from acetone:hexane to obtain the 17α-propadienyl-17β-acetoxyestr-4-en-3-one product.

The foregoing procedure is repeated using 17β-(3-iodo- or fluoropropynyl)-17β-acetoxyestr-4-en -3-one and 17α-(3-bromopropynyl)-17β-acetoxyestr-4-en-3-one to obtain the same 17α-propadienyl product. This can be hydrolyzed to 17α-propadienylestr-4-en-17β-ol-3-one.

In like manner, 17α-propadienyl-18-methylestr-4-en-17β-ol-3-one, 6,6-difluoro-17α-propadienylestr-4-en-17β-ol -3-one, 6,6-difluoro-17α-propadienyl-18-methylestr-4-en-17β-ol-3-one, 17α-propadienylestra-5-(10),9(11)-dien-17β-ol-3-one, 17α-propadienyl-18-methylestra-5(10),9(11)-dien-17β-ol-3-one, 17α-propadienylestra-4,9(10)-dien-17β-ol-3-one, 17α-propadienyl-18-methylestra-4,9(10)-dien-17β-ol-3-one, 17α-propadienylestra-4,9(10),11-trien-17β-ol-3-one, and 17α-propadienyl-18-methylestra-4,9(10),11-trien-17β-ol-3-one, are prepared from the respective 3-bromopropynyl, 3-fluoropropynyl, 3-iodopropynyl, or 3-chloropropynyl starting compounds.

The foregoing procedure is practiced using glyme in lieu of glacial acetic acid and tetrahydrofuran in lieu of glacial acetic acid, with similar results. For example, 17α-(3-bromopropynyl)-17β-acetoxyestr-4-en-3-one is thus converted to 17α-propadienyl-17β-acetoxyestr-4-en-3-one.

EXAMPLE 2

One gram of 17α-(3-chloropropynyl)-androst-4 -en-17β-ol-3-one is dispersed in 50 ml. of ethanol at room temperature. Three grams of copper sulfate are dispersed in 20 ml. of water and to the resultant aqueous solution is suspended 5 grams of zinc dust. The zinc-copper powder formed from this suspension is added to the steroid ethanol solution in a portionwise fashion at room temperature. Upon completion of the addition, the reaction mixture is heated to the boiling point and maintained under reflux conditions for 16 hours. It is then filtered through Celite, the filtrate is collected and evaporated to dryness and the residue crystallized from acetone:hexane to obtain the 17α-propadienylandrost-4-en-17β-ol-3-one product.

The above procedure is repeated using 17α-(3-chloropropynyl)-estr-4-en-17β-ol-3-one to give 17α-propadienylestr-4-en-17β-ol-3-one. Similarly, the 3-bromopropynyl and 3-iodo- or fluoropropynyl compounds are converted to the respective 17α-propadienyl products.

In like manner, 17α-propadienyl-18-methylestr-4-en-17β-ol-3-one, 6,6-difluoro-17α-propadienylestr-4-en-17β-ol-3-one, and 6,6-difluoro-17α-propadienyl-18-methylestr-4-en-17β-ol-3-one, 17α-propadienylestra -5(10),9(11)- dien-17β-ol-3-one, 17α-propadienyl-18-methylestra-5-(10),9(11)-dien-17β-ol-3-one, 17α-propadienylestra-4,9(10)-dien-17β-ol-3-one, 17α-propadienyl-18-methylestra-4,9(10)-dien-17β-ol-3-one, 17α-propadienylestra-4,9(10), 11-trien-17β-ol-3-one, and 17α-propadienyl-18-methylestra-4,9(10),11-trien-17β-ol-3-one, are prepared from the respective 3-bromopropynyl, 3-fluoropropynyl, 3-iodopropynyl, or 3-chloropropynyl starting compounds.

Acetylation at C-17β provides the corresponding 17β-acetates, e.g., 17α-propadienyl-17β-acetoxyestr-4-en-3-one, 17α-propadienyl-17β-acetoxy-18-methylestr-4-en-3-one, 6,6-difluoro-17α-propadienyl-17β-acetoxyestr-4-en-3-one, 6,6-difluoro-17α-propadienyl-17β-acetoxy-18-methylestr-4-en-3-one, 17α-propadienyl-17β-acetoxyestra-5(10), 9(11)-dien-3-one, 17α-propadienyl-17β-acetoxy-18-methylestra-5(10),9(11)-dien-3-one, 17α-propadienyl-17β-acetoxyestra-4,9(10)-dien-3-one, 17α-propadienyl-17β-acetoxy-18-methyl-estra-4,9(10)-dien-3-one, 17α-propadienyl-17βacetoxyestra-4,9(10),11-trien-3-one, and 17α-propadienyl-17β-acetoxy-18-methylestra-4,9 (10), 11-trien-3-one.

EXAMPLE 3

A steroid solution is prepared by dispersing 2 grams of 3-methoxy-17α-(3-chloropropynyl)-estra-1,3,5(10)-trien-17β-ol in 100 ml. of isopropanol at room temperature with stirring. Five grams of finely divided magnesium metal is added to the mixture in a portionwise fashion and at room temperature. The temperature of the resultant mixture is raised to the boiling point and maintained under reflux and under an atmosphere of nitrogen for 24 hours. Upon completion of the reaction, excess magnesium is cautiously removed by filtration and the remaining solution is washed with 5 ml. of isopropanol and then 5 ml of water. The organic layer is separated, dried over sodium sulfate, and evaporated to dryness under reduced pressure. The residue is purified by chromatography over alumina and crystallized from methanol:benzene to provide the 3-methoxy-17α-propadienylestra1,3,5()-trien-17β-ol product.

EXAMPLE 4

A steroidal solution is prepared by dispersing 1 gram of 6,6-difluoro-17α-(3-chloropropynyl)estr-4-en-17β-ol-3-one in 200 ml. of acetone. Sixty milliliters of a recently prepared solution of chromous chloride (Rosenkranz et al., *Journal of the American Chemical Society*, 72, 4077 (1950) is added to the steroid solution. The addition is carried out in a portionwise fashion at room temperature while maintaining the entire mixture under an atmosphere of nitrogen. Five minutes following the addition, the acetone is removed under reduced pressure and water is added which initiates precipitation. The precipitated solid is collected and dried over sodium sulfate. The dried solid is then crystallized from acetone:hexane to obtain the 6,6-difluoro-17α-propadienylestr-4-en-17β-ol-3-one product.

Alternatively, 6,6-difluoro-17α-(3-chloropropynyl)-estr-4-en-3β, 17β-diol is reacted to give 6,6-difluoro-17α-propadienylestr-4-ene-3β, 17β-diol which is oxidized, as described above, to give 6,6-difluoro-17α-propadienylestr-4-en-17β-ol-3-one.

EXAMPLE 5

Two grams of 17α-(3-chloropropynyl)-estr-5(10)-en-17β-ol-3-one is dispersed in a mixture of 50 ml. of anhydrous methanol containing 25 g. of zinc dust. The thus prepared mixture is then heated to the boiling point and maintained under reflux for 8 hours, with stirring. It is then cooled and poured into water. The aqueous mixture is then extracted with ethyl acetate and the extracts are separated and recovered and, upon recovery, dried over anhydrous sodium sulfate. The dried extracts are then evaporated to dryness. The residue remaining after the evaporation is recrystallized from acetone:hexane to obtain the 17α-propadienylestr-5-(10)-en-17β-ol-3-one product.

EXAMPLE 6

A solution of 17α-(3-chloropropynyl-17β-acetoxyestr-4-en-3-one (2.8 g.) in anhydrous methanol (50 ml.) is heated under reflux with zinc-copper couple (18.7 g.) for 1 hour. The couple is prepared by treating 21.0 g. of zinc dust with 1.2 g. of copper acetate in 30 ml. of hot acetic acid at 90°C. for 3 minutes followed by cooling, removal of the acetic acid by decantation and successive washings with dry ether (3 × 75 ml.) and dry methanol (2 × 75 ml.). The cooled solution is filtered, concentrated to ca. 20 ml., diluted with water and the rpoduct isolated by extraction with methylene dichloride. A solution of the resulting solid dissolved in hexane-ether (2:1) is adsorbed on a column of silica gel. Elution with hexane-ether (3:2) affords 17α-propadienyl-17β-acetoxyestra-4-en-3-one. A solution of 17α-propadienyl-17β-acetoxyestr-4-en-3-one (0.45 g.) in methanol (10 ml.) is treated with 1.0 N methanolic sodium methoxide (1 ml.) and after 24 hours the resulting solution is neutralized with acetic acid. The solvent is evaporated under reduced pressure and the resulting residue is purified by preparative tlc to give 17α-propadienylestr-4-en-17β-ol-3-one, after crystallization from ether-hexane.

In like manner, from 17α-(3-chloropropynyl)-17β-acetoxy-18-methylestr-4-en-3-one, 6,6difluoro-17α-(3-difluoro-17α-(3-chloropropynyl)-17β -acetoxy-18-methylestr-4-en-3-one there is respectively prepared 17α-propadienyl-17β-acetoxy-18-methylestr-4-en-3-one, 6,6-difluoro-17α-propadienyl-17β-acetoxyestr-4-en-3-one, and 6,6-difluoro-17α-propadienyl-17β-acetoxy-18-methylestr-4-en-3-one which upon hydrolysis respectively give 17α-propadienyl-18-methylestr-4-en-17β-ol-3-one, 6,6-difluoro-17α-propadienylestr-4-en-17β-ol-3-one, and 6,6-difluoro-17α-propadienyl-18-methylestr-4-en-17β-ol-3-one.

Likewise prepared are 17α-propadienylestra-5 (10),9(11)-dien-17β-ol-3-one, 17α-propadienyl-18-methylestra-5(10), 9(11)-dien-17β-0l-3-one, 17α-propadienylestra-4,9(10)-dien-17β-ol-3-one, 17α-propadienyl-18methylestra-4,9(10)-dien-17β-ol-3-one, 17α-propadienylestra-4,9(10), 11-trien-17β-ol-3-one, and 17α-propadienyl-18methylestra-4,9(10),11-trien-17β-ol-3-one and the corresponding 17β-acetates.

The above procedure is repeated using zinc dust in ethanol, with similar results.

EXAMPLE 7

Sixty-two grams of zinc dust are shaken with 50 ml. of 3 percent hydrogen chloride for 1 minute, washed three times with 50 ml. of 3 percent hydrogen chloride (decantation), and then abundantly with water, twice with 100 ml. of 2 percent copper sulfate, abundantly with water, three times with 95 percent ethanol, and four times with absolute ethanol. The washed zinc-copper couple (1.5 g.) was added to a mixture of 250 mg. of 17α-(3-chloropropynyl)-17β-acetoxyestr-4-en-3-one in 25 ml. of absolute ethanol. The mixture is heated at reflux for 4 hours after which time it is filtered. Evaporation of solvent and purification of the residue on silica gel G eluting with hexane:ethyl acetate (7:3) gives 17α-propadienyl-17β-acetoxyestr-4-en-3-one which can be base hydrolyzed to the corresponding 17β-ol.

EXAMPLE 8

A solution of 6,6-difluoro-17α-(3-bromopropynyl)-17β-acetoxyestr-4-en-3-one (2.8 g.) in anhydrous methanol (50 ml.) is heated with zinc-copper couple (18.7 g.) at 35° to 40°C. with stirring. The progress of the reaction is continuously monitored by thin layer chromatography. When the formation of the desired product is essentially completed, the reaction mixture is cooled, filtered, concentrated to ca. 20 ml., diluted with water and product isolate isolated by extraction with methylene dichloride. A solution of the resulting solid dissolved in hexane:ether (2:1) is adsorbed on a column of silica gel. Elution with hexane:ether (3:2) affords 6,6-difluoro-17α-propadienyl-17β-acetoxyestr-4-en-3-one. The product can be hydrolyzed or the procedure performed with 6,6-difluoro-17α-(3-bromopropynyl)-estr-4-en-17β-ol-3-one to give 6,6-difluoro-17α-propadienylestr-4-en-17β-ol-3-one.

The procedure of the present example is repeated with 6,6-difluoro-17α-(3-chloropropynyl)-17β-acetoxyestr-4-en-3-one and at 50° to 55°C. to give 6,6-difluoro-17α-prop-adienyl-17β-acetoxyestr-4-en-3-one and, after hydrolysis, 6,6-difluoro-17α-propadienylestr-4-en-17β-ol-3-one. This procedure is repeated using 6,6-difluoro-17α-(3-chloropropynyl)-estr- 4-ene-3β,17β-diol as a starting compound to give 6,6-difluoro-17α-propadienylestr-4-en-3β,17β-diol which is oxidized with manganese dioxide, as described above to give 6,6-difluoro-17α-propadienylestr-4-en-17β-ol-3-one. Use of the 3β,17β-bistetrahydropyran-2'-yloxy starting compounds affords the corresponding 3β,17β-bistetrahydropyran-2'-yloxy-17α-propadienyl products which can be hydrolyzed with malonic acid, as described above, to give the diol followed by oxidation, as described above, to give 6,6-difluoro-17α-propadienylestr-4-en-17β-ol-3-one.

EXAMPLE 9

The reaction mixture of Preparation 15 containing 3,3-ethylenedioxy-6,6-difluoro-17α-(3) -chloropropynyl)-18-methylestr-4-en-17β-ol in anhydrous methanol (50 ml.) is heated with zinc-copper couple (18.7 g.) at 50° to 55°C. with stirring. The progress of the reaction is continuously monitored by thin layer chromatography. When the formation of the desired product is essentially completed, the reaction mixture is cooled, filtered, concentrated to ca. 20 ml., diluted with water and the product isolated by extraction with methylene dichloride. A solution of the resulting solid dissolved in hexane: ether (2:1) is adsorbed on a column of silica gel. Elution with hexane:ether (3:2) affords 3,3-ethylenedioxy-6,6-difluoro-17α-propadienyl-18-methylestr-4-en-17β-ol. This compound is suspended in about 2 ml. of methanol and treated with 1 drop of concentrated hydrogen chloride. After monitoring with tlc shows the reaction to be complete, the reaction mixture is diluted with 2 ml. of water and filtered to give 6,6-difluoro-17α-propadienylestr-4-en-17β-ol-3-one.

The product can be acetylated or the procedure performed with 6,6-difluoro-17α-(3-chloropropynyl)-17β-acetoxyestr-4-en-3-one to give 6,6-difluoro-17α-propadienyl-17β-acetoxyestr-4-en-3-one.

EXAMPLES 10 to 20

In accordance with the methods and procedures of the present invention, the following reactions are carried out.

By reacting together 17α-(3-fluoropropynyl)-17β-acetoxy-18-methylandrost-4-en-3-one and zinc dust with ethanol as liquid reaction medium and proton donor, in accordance with the method of Example 1, there is obtained the 17α-propadienyl-17β-acetoxy-18-methylandrost-4-en-3-one product.

By reacting together 17α-(3-chloropropynyl)-18-ethylestr-4-en-17β-ol-3-one and zinc-copper couple in ethanol and t-butanol medium in accordance with the method of Example 3, there is obtained the 17α-propadienyl-18-ethylestr-4-en-17β-ol-3-one product.

By reacting together 17α-(3-bromopropynyl)-17β-propionyloxy-18-n-propylestr-5(10)-en-3-one and aluminum metal in tetrahydrofuran containing 10 percent t-butanol and heating to reflux in accordance with the method of Example 3, there is obtained the 17α-propadienyl-17β-propionyloxy-18-n-propylestr-4-en-3-one product.

By reacting together 17α-(3-chloropropynyl)-18-isopropylestra-1,3,5(10)-triene-3,17β-diol and manganese metal in an isopropyl ether:isopropanol (9:1) medium in accordance with the method of Example 3, there is obtained the corresponding 17α-propadienyl-18-isopropylestra-1,3,5(10)-triene-3,17β-diol product.

By reacting together 3-ethoxy-17α-(3-fluoropropynyl)-17β-propionyloxyestra-1,3,5(10)-triene and zinc dust in propionic acid medium at 50°C. in accordance with the method of Example 1, there is obtained the 3-ethoxy-17α-propadienyl-17β-propionyloxy-18-methylestra-1,3,5(10)-triene product.

By reacting together 17α-(3-bromopropynyl)-17β-butyryloxy-18-isopropylandrost-4-en-3-one and zinc dust in methanol medium in accordance with the method of Example 1, there is obtained the 17α-propadienyl-17β-butyryloxy-18-isopropylandrost-4-en-3-one product.

By reacting together 17α-(3-chloropropynyl)-17β-acetoxy-18-methylestr-4-en-3-one and chromium(ous) sulfate in aqueous acetone medium under an atmosphere of nitrogen in accordance with Example 4, there is obtained the corresponding 17α-propadienyl-17β-acetoxy-18-methylestr-4-en-3-one product.

By reacting together 3-methoxy-17α-(3-fluoropropynyl)-17β-tetrahydropyran-2'-yloxyestra-1,3,5(10)-triene and chromous acetate in aqueous diethyl ketone and n-hexane in accordance with the method of Example 4, there is obtained the corresponding 3-methoxy-17α-propadienyl-17β-tetrahydropyran-2'-yloxyestra-1,3,5(10)-triene product.

By reacting together 3β,17β-diacetoxy-6,6-difluoro-17α-(3-chloropropynyl)androst-4-ene and chromous acetate in acetone and water in accordance with the method of Example 4, there is obtained the 3β,17β-diacetoxy-6,6-difluoro-17α-propadienylandrost-4-ene product.

In accordance with the foregoing methods, the following compounds are prepared, those methods employing an acid as liquid reaction medium or proton donor being avoided for the ether derivatives.

3β,17β-bis(tetrahydropyran-2'-yloxy)-6,6-difluoro-17α-propadienylestr-4-ene, 6,6-difluoro-17α-propadienyl-17β-acetoxyestr-4-en-3-one.

6,6-difluoro-17α-propadienyl-17β-propionyloxyandrost-4-en-3-one, 6,6-difluoro-17α-propadienyl-17β-benzoyloxyestr-4-en-3-one, 6,6-difluoro-17α-propadienyl-17β-adamantoyloxyestr-4-en-3-one, 3β-propionyloxy-6,6-difluoro-17α-propadienylandrost-4-en-17β-ol, 3β,17β-bis(adamantoyloxy)-6,6-difluoro-17α-propadienylestr-4-ene, 3β-(β-chloropropionyloxy)-6,6-difluoro-17α-propadienyl-17β-tetrahydrofuran-2'-yloxyandrost-4-ene, 3β-butyryloxy-6,6-difluoro-17α-propadienyl-17β-tetrahydropyran-2'-yloxyandrost-4-ene, 3β-tetrahydropyran-2'-yloxy-6,6-difluoro-17α-propadienyl-17β-caproyloxyestr-4-ene, 3β-tetrahydrofuran-2'-yloxy-6,6-difluoro-17α-propadienyl-17β-caproyloxyestr-4-ene, 3β-tetrahydropyran-2'-yloxy-6,6-difluoro-17α-propadienyl-17β-heptanoyloxyandrost-4-ene, and 3β17β-dipentanoyloxy-5,5-difluoro-17α-propadienylestr-4-ene.

Elaboration at C-3β can be performed after the principal reaction as follows.

EXAMPLE 21

A solution of 1 g. of 17α-propadienylandrost-4-en-17β-ol-3-one in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 17α-propadienylandrost-4-ene-3β,17β-diol which may be further purified through recrystallization from acetone:hexane.

In like manner, the other 3-oxo derivatives bearing a 17α-propadienyl grouping prepared in accordance herewith are reduced to the corresponding 3β-hydroxyl compounds, for example, 17α-propadienylestr-4-ene-3β,17β-diol, 17α-propadienyl-17β-tetrahydrofuran-2'-yloxyestr-4-en-3β-ol, and 6,6-difluoro-17α-propadienylestr-4-ene-3β,17β-diol.

EXAMPLE 22

A solution of 17α-propadienylestr-4-en-17β-ol-3-one (0.35 g.) and lithium tri-t-butoxyaluminum hydride (2.0 g.) in anhydrous tetrahydrofuran (20 ml.) is heated under reflux for 16 hours, cooled and diluted with water. The resultant mixture is extracted with several portions of methylene dichloride and the combined extracts are washed with water, dried ($Na_2SO_4$)

and evaporated. Purification of the resultant product by preparative tlc affords 17α-propadienylestr-4-en-3β,17β-diol.

Treatment of 17α-propadienylestr-4-en-3β,17β-diol (0.20 g.) with 2.5 ml. of acetic anhydride-pyridine (1:4) for 18 hours at room temperature provides the 3β-acetoxy-17α-propadienylestr-4-en-17β-ol product.

In like manner, from 17α-propadienyl-18-methylestr-4-en-17β-ol-3-one, 6,6-difluoro-17α-propadienylestr-4-en-17β-ol-3-one, 6,6-difluoro-17α-propadienyl-18-methylestr-4-en-17β-ol-3-one, 17α-propadienyl-17β-acetoxyestr-4-en-3-one, 17α-propadienyl-17β-acetoxy-18-methylestr-4-en-3-one, 6,6-difluoro-17α-propadienyl-17β-acetoxyestr-4-en-3-one, 6,6-difluoro-17α-propadienyl-17β-acetoxy-18-methylestr-4-en-3-one, 17α-propadienylestra-4,9(10)-dien-17β-ol-3-one, 17α-propadienylestra-5(10),9(11)-dien-17β-ol-3-one, 17α-propadienylestra-4,9(10),11-trien-17β-ol-3-one there is respectively prepared:

3β-acetoxy-17α-propadienyl-18-methylestr-4-en-17β-ol, 6,6-difluoro-3β-acetoxy-17α-propadienylestr-4-en-17β-ol, 6,6-difluoro-3β-acetoxy-17α-propadienyl-18-methylestr-4-en-17β-ol, 3β,17β-diacetoxy-17α-propadienylestr-4-en-3-one, 3β,17β-diacetoxy-17α-propadienyl-18-methylestr-4-en-3-one, 6,6-difluoro-3β,17β-diacetoxy-17α-propadienylestr-4-en-3-one,6,6-difluoro-3β,17β-diacetoxy-17α-propadienyl-18-methylestr-4-en-3-one, 3β-acetoxy-17α-propadienylestra-4,9(10)-dien-17β-ol, 3β-acetoxy-17α-propadienylestra-5(10),9(11)-dien-17β-ol, and 3β-acetoxy-17α-propadienyl-estra-4,9(10),11-trien-17β-ol through the 3β-hydroxy compounds.

EXAMPLE 23

One gram of 17α-propadienyl-17β-acetoxyestr-4-en-3-one in 50 ml. of tetrahydrofuran containing 3 grams of lithium tri-t-butoxyaluminum hydride is heated under reflux for 45 minutes. After this time, the solution is poured into water and extracted with 4 × 250 ml. portions of ethyl acetate. The extracts are washed with water, dried and concentrated. The concentrate is chromatographed on 40 g. of neutral aluminum to give 17α-propadienyl-17β-acetoxyestr-4-en-3β-ol which is crystallized from n-hexane.

EXAMPLE 24

Two milliliters of dihydropyran are added to a solution of 1 g. of 17α-propadienyl-17β-caproyloxyandrost-4-en-3β-ol in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3β-tetrahydropyran-2'-yloxyl-17α-propadienyl-17β-caproyloxyandrost-4-ene which is recrystallized from pentane.

To a solution of 1 g. of 17β-propadienylandrost-4-ene-3β,17β-diol in 20 ml. of benzene is added 20 ml. of dihydrofuran. Five milliliters is distilled off to remove moisture, and the mixture is allowed to cool to room temperature. To the cooled mixture, 0.2 g. of freshly purified p-toluenesulfonyl chloride is added. The mixture is stirred at room temperature for 24 hours and then poured into an excess of 5 percent aqueous bicarbonate solution. The product is extracted with ethyl acetate, the organic solution is washed with water to neutral, dired over anhydrous magnesium sulfate, and evaporated to dryness under reduced pressure. The oily residue crystallizes on the addition of ether to yield the 3β,17β-bis(tetrahydrofuran-2'-yloxy)-17α-propadienylandrost-4-ene.

In like manner, the tetrahydropyranyl and tetrahydrofuranyl ethers of the 17α-propadienyl compounds hereof are prepared, for example, 3β-tetrahydropyran-2'-yloxy-17α-propadienyl-17β-acetoxy-18-methylandrost-4-ene, 3β-tetrahydrofuran-2'-yloxy-17α-propadienyl-17β-heptanoyloxyestr-5(10)-ene, 3β,17β-bis(tetrahydropyran-2'-yloxy)-17α-propadienyl-18-ethylandrost-4-ene, 3β-tetrahydropyran-2'-yloxy-17α-propadienyl-17β-adamantoyloxy-18-methylestr-4-ene, and 3β,17β-bis(tetrahydropyran-2'-yloxy)-6,6-difluoro-17α-propadienyl-18-ethylandrost-4-ene.

EXAMPLE 25

A mixture of 1 g. of 17α-propadienyl-17β-acetoxyestr-4-en-3β-ol, 4 ml. of pyridine and 2 ml. of acetic anhydride is allowed to stand at room temperature for 15 hours. The mixture is then poured into ice water and the solid which forms is collected by filtration, washed with water and dried to yield 3β,17β-diacetoxy-17α-propadienylestr-4-ene which may be further purified through recrystallization from acetone:hexane.

Similarly, the corresponding 3β-esters of the other 17α-propadienyl products thereof are prepared upon substitution of the appropriate starting compund and conventional acylating agent, for example, 3β-trimethylacetoxy-17α-propadienyl-17β-acetoxyestr-4-ene, 3β,17β-dipropionyloxy-17α-propadienylandrost-4-ene, 3β-butyryloxy-6,6-difluoro-17α-propadienyl-17β-tetrahydropyran-2'-yloxyestr-4-ene, 3β-pentanoyloxy-17α-propadienyl-17β-acetoxyestr-5(10)-ene, 3β,17β-bis(benzoyloxy)-17α-propadienylandrost-4-ene, and 3β-acetoxy-6,6-difluoro-17α-propadienyl-17β-propionyloxyandrost-4-ene.

EXAMPLE 26

The corresponding C-3 substituted derivatives of the 17α-propadienyl products in the estrogen series are prepared in accordance with the above procedures using the 3-hydroxyl derivative as starting compund. This starting compound can be formed after the principal reaction hereof upon conventional hydrolysis of the protective grouping, such as a tetrahydropyran-2'-yloxy grouping, with acid hydrolysis. Representative 3-substituted compounds of this series thus prepared are:

3-acetoxy-17α-propadienyl-17β-tetrahydropyran-2'-yloxyestra-1,3,5(10)-triene, 3,17β-diacetoxy-17α-propadienylestra-1,3,5(10)-triene, 3,17β-bis(benzoyloxy)-17α-propadienyl-18-ethylestra-1,3,5(10)-triene, and 3-caproyloxy-17α-propadienyl-17β-tetrahydrofuran-2'-yloxy-18-propylestra-1,3,5(10)-triene.

Further representative 6,6-difluoro-17α-propadienylandrost-4-enes and 19-nor derivatives prepared in accordance with the above procedures are as follows:

3β,17β-diacetoxy-6,6-difluoro-17α-propadienyl-18-n-propylestr-4-ene,
3β,17β-diacetoxy-6,6-difluoro-17α-propadienyl-18-methylestr-4-ene,
3β,17β-diacetoxy-6,6-difluoro-17α-propadienyl-18-ethylandrost-4-ene,
3β,17β-dipropionyloxy-6,6-difluoro-17α-propadienylestr-4-ene,
3β,17β-dipropionyloxy-6,6-difluoro-17α-propadienyl-18-methylandrost-4-ene,
3β,17β-bis(tetrahydropyran-2'-yloxy)-6,6-difluoro-18-isopropylestr-4-ene,
β,17β-bis(tetrahydropyran-2'-yloxy)-6,6-difluoroandrost-4-ene,
3β,17β-bis(tetrahydrofuran-2'-yloxy)-6,6-difluoro-18-ethylandrost-4-ene,
3β,17β-bis(tetrahydrofuran-2'-yloxy)-6,6-difluoro-18-ethylestr-4-ene,
6,6-difluoro-17α-propadienyl-17β-propionyloxyestr-4-en-3-one,
6,6-difluoro-17α-propadienyl-17β-propionyloxy-18-methylestr-4-en-3-one,
6,6-difluoro-17α-propadienyl-17β-butyryloxyester-4-en-3-one,
6,6-difluoro-17α-propadienyl-17β-butyryloxy-18-methyl-estr-4-en-3-one,
6,6-difluoro-17α-propadienyl-17β-pentanoyloxyestr-4-en-3-one,
6,6-difluoro-17α-propadienyl-17β-pentanoyloxy-18-methylestr-4-en-3-one,
6,6-difluoro-17α-propadienyl-17β-pentanoyloxyandrost-4-en-3-one,
6,6-difluoro-17α-propadienyl-17β-hexanoyloxyestr-4-en-3-one,
6,6-difluoro-17α-propadienyl-17β-heptanoyloxyandrost-4-en-3-one,
6,6-difluoro-17α-propadienyl-17β-caproyloxyestr-4-en-3-one,
6,6-difluoro-17α-propadienyl-17β-caproyloxy-18-methyl-estr-4-en-3-one,
6,6-difluoro-17α-propadienyl-17β-benzoyloxyandrost-4-en-3-one,
6,6-difluoro-17α-propadienyl-17β-adamantoyloxyestr-4en-3-one,
6,6-difluoro-17α-propadienyl-17β-(β-chloropropionyloxy)-estr-4-en-3-one,
6,6-difluoro-17α-propadienyl-17β-trimethylacetoxyandrost-4-en-3-one,
6,6-difluoro-17α-propadienyl-17β-trimethylacetoxyestr-4-en-3-one.

What is claimed is:

1. The process which comprises reacting a 17α-(3-halopropynyl) steroid with a reagent selected from metals having an oxidation potential between +2.37 to +0.74 volts inclusive, chromium metal salts, and zinc-copper couple, to prepare a corresponding 17α-propadienyl steriod.

2. The process according to claim 1 conducted at a temperature of from about 20°C. to about 120°C.

3. The process according to claim 2 conducted in organic liquid reaction medium and in the presence of a proton donor.

4. The process according to claim 1 wherein the reagent is a metal having an oxidation potential between +2.37 to +0.74 volts inclusive.

5. The process according to claim 4 wherein the reagent is a metal selected from magnesium, aluminum, and zinc.

6. The process according to claim 5 wherein the ragent is zinc metal.

7. The process according to claim 6 conducted in a lower aliphatic alcohol or a carboxylic acid containing less than 12 carbon atoms.

8. The process according to claim 1 wherein the reagent is a chromium metal salt.

9. The process according to claim 8 wherein the reagent is chromous chloride.

10. The process according to claim 1 wherein the reagent is zinc-copper couple.

11. The process according to claim 10 conducted in a lower aliphatic alcohol.

12. The process according to claim 1 wherein the 17α-(3-halopropynyl) steriod is a 17α-(3-chloropropynyl) steroid.

13. The process according to claim 12 wherein the reagent is zinc metal.

14. The process according to claim 12 wherein the reagent is zinc-copper couple.

15. The process according to claim 1 wherein there is prepared a 17α-propadienyl steriod of one of the formulas:

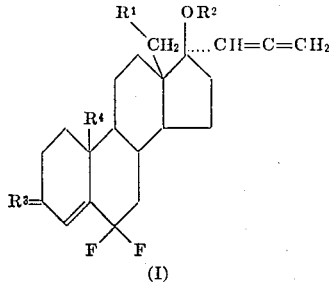

(I)

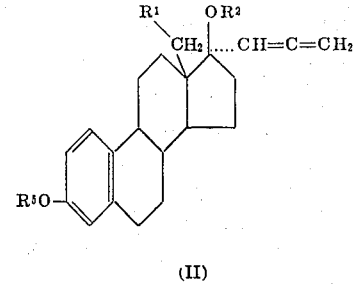

(II)

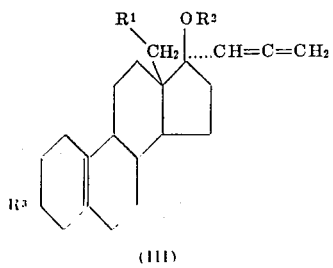

(III)

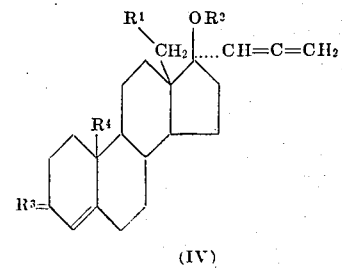

(IV)

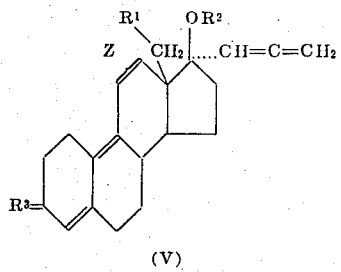
(V)

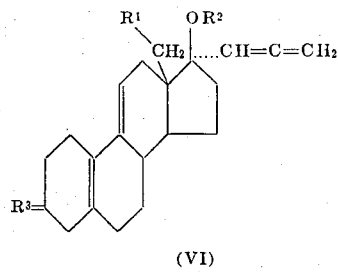
(VI)

wherein,
R$^1$ is hydrogen or lower alkyl of from 1 to 3 carbon atoms, inclusive;
R$^2$ is hydrogen, tetrahydrofuran-2-yl, tetrahydropyran-2-yl, or a carboxylic acyl group containing less than 12 carbon atoms;
R$^3$ is an oxo group or the group

in which R$^6$ is hydrogen, tetrahydrofuran-2-yl, tetrahydropyran-2-yl, or a carboxylic acyl group containing less than 12 carbon atoms;
R$^4$ is hydrogen or methyl;
R$^5$ is hydrogen, lower alkyl of from 1 to 8 carbon atoms, inclusive, cycloalkyl, tetrahydrofuran-2-yl, tetrahydropyran-2-yl, or a carboxylic acyl group containing less than 12 carbon atoms; and
Z is a carbon-carbon single bond or a carbon-carbon double bond.

16. The method claimed in claim 15 wherein a 17α-propadienylestr-4-ene or a 17α-propadienyl-18-methylestr-4-ene steriod is prepared.

17. The method claimed in claim 15 wherein a 6,6-difluoro-17α-propadienylestr-4-ene or a 6,6-difluoro-17α-propadienyl-18-methylestr-4-ene steriod is prepared.

18. The process according to claim 15 wherein a 17α-propadienylestra-5(10),9(11)-diene, 17α-propadienyl-estra-4,9(10)-diene, or 17α-propadienylestra-4,9(10),11-triene steriod is prepared.

19. A compound selected from those represented by the formula:

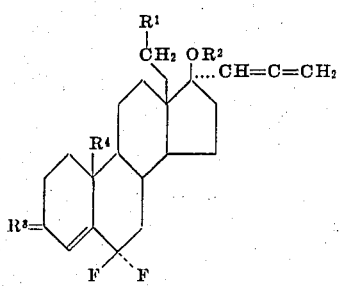

wherein
R$^1$ is hydrogen or lower alkyl of from 1 to 3 carbon atoms, inclusive;
R$^2$ is hydrogen, tetrahydrofuran-2-yl, tetrahydropyran-2-yl, or a carboxylic acyl group containing less than 12 carbon atoms;
R$^3$ is an oxo group or the group

in which R$^6$ is hydrogen, tetrahydrofuran-2-yl, tetrahydropyran-2-yl or a carboxylic acyl group containing less than 12 carbon atoms; and
R$^4$ is hydorgen or methyl.

20. The compound according to claim 19 wherein R$^1$ is hydrogen, R$^2$ is hydrogen, R$^3$ is an oxo group and R$^4$ is hydrogen; 6,6-difluoro-17α-propadienylestr-4-en-17β-ol-3-one.

21. The compound according to claim 19 wherein R$^1$ is hydrogen, R$^2$ is acetyl, R$^3$ is an oxo group and R$^4$ is hydrogen; 6,6-difluoro-17α-propadienyl-17β-acetoxyestr-4-en-3-one.

22. The compound according to claim 19 wherein R$^1$ is methyl, R$^2$ is hydrogen, R$^3$ is an oxo group and R$^4$ is hydrogen; 6,6-difluoro-17α-propadienyl-18-methylestr-4-en-17β-ol-3-one.

23. The compound according to claim 19 wherein R$^1$ is methyl, R$^2$ is acetyl, R$^3$ is an oxo group and R$^4$ is hydrogen; 6,6-difluoro-17α-propadienyl-17β-acetoxy-18-methylestr-4-en-3-one.

24. A compound selected from those of claim 19 of the formula:

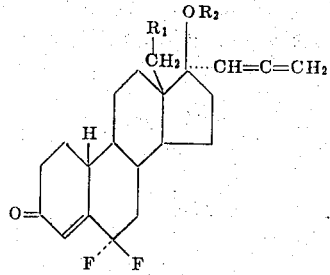

wherein R$^1$ is hydrogen or methyl and R$^2$ is hydrogen or a carboxylic acyl group containing less than 12 carbon atoms.

* * * * *